United States Patent
Kaneda et al.

(10) Patent No.: US 6,638,662 B2
(45) Date of Patent: Oct. 28, 2003

(54) LITHIUM SECONDARY BATTERY HAVING OXIDE PARTICLES EMBEDDED IN PARTICLES OF CARBONACEOUS MATERIAL AS A NEGATIVE ELECTRODE-ACTIVE MATERIAL

(75) Inventors: Junya Kaneda, Hitachi (JP); Seiji Takeuchi, Hitachiota (JP); Noriyuki Watanabe, Hitachinaka (JP); Takahiro Yamaki, Hitachi (JP); Yasushi Muranaka, Hitachinaka (JP); Yasuhisa Aono, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/505,203

(22) Filed: Feb. 16, 2000

(65) Prior Publication Data

US 2003/0129494 A1 Jul. 10, 2003

(30) Foreign Application Priority Data

Feb. 23, 1999 (JP) .......................... 11-044119

(51) Int. Cl.[7] .............................. H01M 4/58
(52) U.S. Cl. .............................. 429/231.8; 429/218.1; 429/231.1; 429/231.4; 429/232
(58) Field of Search .................... 429/218.1, 231.1, 429/231.4, 231.8, 232

(56) References Cited

U.S. PATENT DOCUMENTS 5,700,298 A * 12/1997 Shi et al. .................... 29/623.1
5,945,211 A * 8/1999 Yamaguchi et al. ......... 428/325
6,053,953 A * 4/2000 Tomiyama et al. ........... 429/48
6,090,736 A * 7/2000 Taoda et al. .................... 502/5
6,210,835 B1 * 4/2001 Arai ....................... 429/231.95

OTHER PUBLICATIONS

Shingu, et al, Nano–Structure Formation by Repeated Compressive Plastic Deformation, Ann. Chim. Fr., 1993, 18, pp. 387–394.

* cited by examiner

Primary Examiner—Carol Chaney
Assistant Examiner—Dah-Wei Yuan
(74) Attorney, Agent, or Firm—Antonelli, Terry, Stout & Kraus, LLP

(57) ABSTRACT

A lithium secondary battery comprising a positive electrode, a negative electrode containing a lithium ion-storable/dischargeable negative electrode-active material and a lithium ion conductive, non-aqueous electrolytic solution or polymer electrolyte, characterized in that the negative electrode-active material comprises particles of carbonaceous material and particles of metal and metal oxide capable of enhancing lithium ion interstitial diffusibility/releasability as embedded in the particles of carbonaceous material, particles of carbonaceous materials and lithium ion interstitially diffusible/releasable particles being prepared by carbonization of a mixture thereof with MA or carbon precursor, has a high capacity and a long cycle life, and can be used in various electric appliances.

20 Claims, 9 Drawing Sheets

LITHIUM SECONDARY BATTERY HAVING OXIDE PARTICLES EMBEDDED IN PARTICLES OF CARBONACEOUS MATERIAL AS A NEGATIVE ELECTRODE-ACTIVE MATERIAL

BACKGROUND OF THE INVENTION

The present invention relates to a novel secondary battery using a non-aqueous electrolytic solution, a process for producing the same and an electrical appliance using the same, and particularly to a lithium secondary battery having distinguished charging/discharging characteristics such as a higher voltage, a higher energy density, a higher charging/discharging capacity and a longer cycle life as well as a higher safety, a process for producing the same and uses of the same.

With increasing needs for use of portable appliances in the field of electronic appliances, miniaturization and weight reduction of appliances are underway, so that development of higher energy density batteries, particularly secondary batteries, has been keenly desired. A lithium secondary battery is one of candidates for secondary batteries satisfying such requirements. Lithium secondary battery has a high voltage and a high energy density and also a light weight, as compared with a nickel-cadmium battery, a lead storage battery and a nickel-hydrogen battery. However, a lithium secondary battery using lithium metal as a negative electrode-active material has problems of short battery life and poor safety because lithium tends to deposit on the negative electrode surface as dendrites, resulting in occurrences of an internal short-circuit to the positive electrode and inactivation toward the electrolytic solution. To avoid risks of using lithium metal, lithium secondary batteries using lithium alloys such as Li—Pb, Li—Al, etc. as negative electrode-active materials have been developed. However, even these lithium secondary batteries still suffer from problems of dendrite deposition and pulverization, so that no satisfactory battery life has been obtained yet. On the other hand, a lithium secondary battery using graphite as a negative electrode-active material has been developed and is now in practical use, where the graphite can store/discharge lithium ions by reactions of diffusing lithium ions into between the c planes of graphite or releasing therefrom, while it is more stable than the chemically active metallic lithium and is free from deposition of lithium dendrites, resulting in prolonged cycle life and increased safety.

In case of using graphite as a negative electrode-active material, the discharge capacity is 370 Ah/kg at most. To increase the capacity of the lithium secondary battery, it is indispensable to use negative electrode-active materials of higher capacity. The negative electrode-active materials of higher capacity include Al, Pb, etc., i.e. elements capable of forming intermetallic compounds with Li, but suffer from a rapid cycle deterioration when used alone or in combination with electroconductive particles as a negative electrode-active material, and thus have not been practically used as a negative electrode-active material. Composite oxides of Sn or Si have been regarded as negative electrode materials of higher capacity, as disclosed, for example, in JP-A-9-213329 and JP-A-8-236158. However, these composite oxides have a high initial capacity, but suffer from a high irreversible capacity, a low Coulomb efficiency and a short cycle life, and thus have not been used as negative electrode-active materials for the lithium secondary battery. So far proposed methods for improving the cycle life of elements capable of forming alloys with an alkali metal, on the other hand, include, for example, a method for coating particles of an element capable of forming an alloy with an alkali metal with a carbonaceous material (JP-A-6-279112) and a method for coating fine particles of Al, Si or the like with a carbonaceous material (JP-A-10-3920). However, it has been found that these carbon-coated materials undergo oxidation of metallic element in the charging/discharging process, resulting in lowered electro-conductivity and considerably lowered charging/discharging characteristics.

BRIEF SUMMARY OF THE INVENTION

An object of the present invention is to provide a lithium, secondary battery with improved deterioration of the characteristics, a higher capacity and a distinguished charging/discharging cycle characteristic, a process for producing the same and electric appliances using the same.

The present invention provides a lithium secondary battery, which comprises a positive electrode, a negative electrode containing a lithium ion-storable/dischareable negative electrode-active material and a lithium ion conductive, non-aqueous electrolytic solution or polymer electrolyte, characterized in that the negative electrode-active material comprises oxide particles containing at least one element selected from Si, Sn, Ge, Al, Zn, Bi and Mg, and particles of carbonaceous material, the oxide particles being embedded in the particles of carbonaceous material.

The present invention also provides a lithium secondary battery, which comprises a positive electrode, a negative electrode containing a lithium ion-storable/dischareable negative electrode-active material and a lithium ion-conductive, non-aqueous electrolytic solution or polymer electrolyte, characterized in that the negative electrode-active material comprises a composite powder containing particles of carbonaceous material and lithium ion-interstitially diffusible/releasable particles selected from at least one of metal particles and metal oxide. particles capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of carbonaceous material and the interstitially diffusible/releasable particles having an average particle size of not more than 5 $\mu$m and particle sizes of not more than 10 $\mu$m for at least 90% by weight thereof.

The present invention further provides processes for producing these lithium secondary batteries, negative electrode materials for lithium secondary batteries, and use of these lithium secondary batteries.

DETAILED DESCRIPTION OF THE INVENTION

Figure 1:
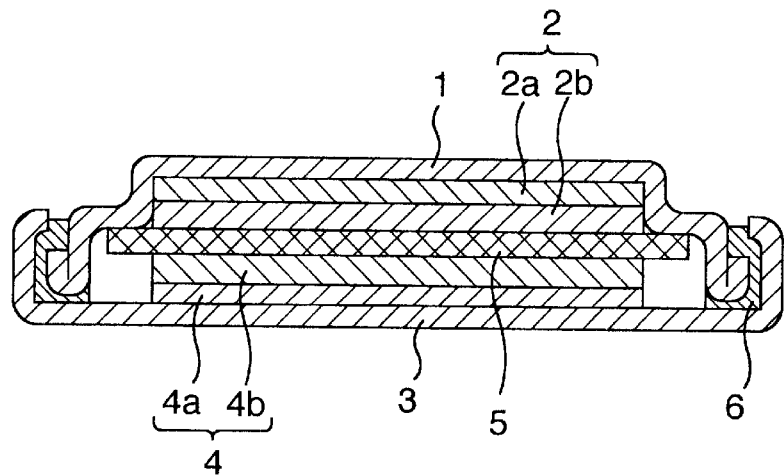
FIG. 1 is a cross-sectional schematic view of the present coin type battery.

Taking into consideration the deterioration mechanisms of high capacity materials for the negative electrode-active materials, the present inventors have found that control of such deterioration can give a lithium secondary battery with a high capacity and a long cycle life.

According to the present invention, there is provided a lithium secondary battery, which comprises a positive electrode, a negative electrode containing a lithium ion-storable/dischargeable negative electrode-active material and a lithium ion-conductive, non-aqueous electrolytic solution or polymer electrolyte, characterized in that the negative electrode-active material comprise s oxide containing at least one element selected from Si, Su, Ge, Al, Zn, Bi and Mg, and a carbonaceous material, the oxide being embedded in the carbonaceous material. It is preferable that particularly graphite carbon or its aggregates are adjacent to the oxide, and the oxide as a whole is embedded in the carbonaceous material.

According to the present invention, there is further provided a lithium secondary battery, which comprises a positive electrode, a negative electrode containing a lithium ion-storable/dischargeable negative electrode-active material and a lithium ion-conductive non-aqueous electrolytic solution or polymer electrolyte, characterized in that the negative electrode-active material comprises a composite powder containing particles of carbonaceous material and lithium ion-interstitially diffusible/releasable particles selected from at least one of metal particles and metal oxide particles, capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of carbonaceous material and the interstitially diffusible/releasable particles having an average particle size of not more than 5 $\mu$m, preferably 0.2 to 2.5 $\mu$m and particle sizes of not more than 10 $\mu$m for at least 90% by weight thereof, preferably at least 95% by weight thereof; or a composite powder containing lithium ion-interstitially diffusible/releasable particles, at least 50% by weight, preferably at least 80% by weight, of which are embedded in particles of carbonaceous material, the composite powder having particle sizes of not more than 50 $\mu$m for at least 90% by weight thereof, preferably at least 95% by weight thereof; or a composite powder containing lithium ion-interstitially diffusible/releasable particles, at least 50% by weight of which are embedded in graphite particles, and the graphite particles comprising at least one of not less than 80% by weight, preferably 90 to 95% by weight, of hexagonal crystals and not more than 20% by weight, preferably 5 to 10% by weight, of rhombohedral crystals.

It is preferable that the metal particles or metal oxide particles comprise at least one metal selected from Si, Sn, Ge, Al, Zn, Bi, Mg, Pb, Sb, B, In, Ga, Tl, P, As, Pd and Pt.

The graphite particles can comprise at least 95% by weight, preferably at least 97% by weight, of crystalline graphite and not more than 5% by weight, preferably not more than 3% by weight, of amorphous graphite.

The negative electrode-active material contains the oxide particles as embedded in the carbonaceous material, where the active material as contained can satisfy at least one, preferably at least two, of the following four requirements for obtaining a lithium secondary battery with distinguished characteristics; (1) the carbonaceous material has a (002) interplanar spacing of 0.3350 nm to 0.3650 nm by X-ray diffraction, (2) the carbonaceous material has a peak intensity ratio of 1360 cm$^{-1}$ to 1580 cm$^{-1}$ being a 0.15 to 2.0 by argon laser Raman spectrometry, (3) the oxide particles have a mean particle size of not more than 10 $\mu$m, and (4) the negative electrode-active material has a specific surface area of 1 m$^2$/g to 100 m$^2$/g.

In a process for producing a lithium secondary battery, which comprises a positive electrode, a negative electrode containing a lithium ion-storable/dischargeable negative electrode-active material and a lithium ion-conductive, non-aqueous electrolytic solution or polymer electrolyte, the negative electrode-active material can be prepared by repeating mechanical pulverization and pressure welding of oxide particles and carbonaceous particles in a ball mill, thereby embedding at least 50% by weight, preferably at least 80% by weight, of the oxide particles in the carbonaceous particles, followed by heating, if required, or by mixing the oxide particles with a carbon precursor, followed by carbonization, or by repeating mechanical pulverization and pressure welding of the oxide particles and the carbonaceous particles in a ball mill, followed by heating, if required, thereby embedding at least 50% by weight preferably at least 80% by weight, of the oxide particles in the carbonaceous particles, and further by their mixing with a carbon precursor, followed by carbonization.

The oxide is an oxide having a composition of ABxOy (A: one element selected from Si, Sn, Ge, Al, Zn, Bi and Mg, preferably at least one element selected from Si, Sn, Ge and Mg; B: at least one element selected from Si, Sn, Ge, Al, Zn, Bi, Mg, P, B, Ca, K, Na, Li and F; x=0 to 1.5, preferably 0 to 1.0; y=1.0 to 5.5, preferably 1.0 to 4.0) and is crystalline or particularly preferably amorphous. Number for x is a sum total of molar radios of total elements as selected for B.

An electric car with good mileage can be provided by mounting a battery assembly consisting of the present lithium secondary batteries on the electric car. The present lithium secondary battery can be also used not only for electric cars but also for hybrid cars.

The oxide includes, for example, SiO, SnO, GeO, SiSnO$_3$, GeSNO$_3$, SiGe$_{0.5}$O$_{1.5}$, SiPO$_{0.2}$B$_{0.2}$O$_2$, GeSi$_{0.1}$O$_{2.2}$GePO$_{0.5}$O$_{3.25}$, GeBO$_{2.5}$, SnSi$_{0.7}$Al$_{0.1}$B$_{0.1}$O$_{2.95}$, SnSi$_{0.8}$Mg$_{0.2}$O$_{2.8}$, etc., but is not limited thereto. The oxide may be oxides or composite oxides, which can electrochemically interstitially diffuse/release Li ions within their oxide structures.

To keep the cycle life of the lithium secondary battery longer, the oxide particles in the negative electrode-active material have an average particle size of preferably not more than 10 $\mu$m, more preferably not more than 5 $\mu$m, most preferably not more than 1 $\mu$m. The particles are embedded in the carbonaceous material, where there are particles completely covered with the carbonaceous material on their surfaces and particles partially exposed to the outside from the carbonaceous material. Though the particles completely covered with the carbonaceous material on the surfaces are preferable, those partially exposed to the outside from the carbonaceous material can be used as well. One particle of the negative electrode-active material contains one or a plurality of said particles embedded in the carbonaceous material. Even the presence of a large number of said particles does not cause any problem in the characteristics, so long as they are embedded in the carbonaceous material. It is preferable that graphite carbon or its aggregates are adjacent or attached to the oxide particles. With such a structure, the charging/discharging characteristics can be improved. Graphite is more advantageous to Li diffusion than amorphous carbon and can contribute to maintenance of distinguished characteristics of oxide and also to control of cycle deterioration.

The oxide particles before mechanical pressure welding may not be particles in said conditions. By repeating mechanical pressure welding, particle sizes can be reduced and thus desired particle size can be selected. Said conditions of negative electrode-active material can be determined by observing the cross-section of negative electrode-active material by a scanning electron microscope (SEM). Particle sizes of particles capable of forming compounds with Li can be determined by determining a particle size distribution of said particles as observed in the cross-section of negative electrode-active material, where number of said particles as determined is 500 to 1,500 for each negative electrode-active material. If the presence of carbonaceous material around said particles can be confirmed in the cross-sectional observation of negative electrode-active material, it can be concluded that said particles are embedded in the carbonaceous material. In the present negative electrode-active material, the presence of carbonaceous material around said particles has been confirmed.

Content ratio by weight of said particles to the active material containing said particles as embedded in the carbonaceous material is preferably 0.05 to 0.95, more preferably 0.10 to 0.90, most preferably 0.20 to 0.80, particularly 0.30 to 0.75.

The carbonaceous material containing said particles as embedded therein must contain a crystalline carbon region. It is possible to embed said particles in a carbonaceous material consisting only of amorphous carbon, but its charging/discharging characteristics are not so good as those in case of crystalline carbon. Crystalline carbon region has a d002 of 0.3350 nm to 0.3650 nm. In the present invention, X-ray diffraction method using X-rays based on CuKa beam at a tube voltage of 50 kV and a tube current of 250 mA with steps of 0.002 to 0.01 deg. is used for the determination. Diffraction curves corresponding to diffraction for (002) plane are smoothed, while eliminating the back-ground, thereby obtaining a substantial (002) diffraction calibration curve. Peak of the calibration curve can be represented by 2θ, where θ is a diffraction angle of (002) plane. d002 is obtained according to the following equations.

$d002 = \lambda/(2 \sin\theta)$ $\lambda = 0.15418$ nm

A (002) diffraction peak splits into a plurality of peaks, depending upon carbonaceous material species, but the d002 corresponding to a maximum intensity peak must be in a range of 0.3350 nm to 0.3650 nm.

On the other hand, the size of crystalline in the C axis direction (Lc) can be obtained from said calibration curve, using the following equations.

$Lc = K \cdot \lambda/(\beta \cdot \cos\theta)$ $K = 0.9$ $\lambda = 0.15418$ nm $\beta$ = half width (radians)

Lc obtained from said calibration curve is preferably more than 0.5 nm, more preferably 1 nm to 100 nm, most preferably 5 nm to 80 nm, particularly 10 nm to 60 nm. Particularly preferable is 15 nm to 50 nm.

For the carbonaceous material it is preferable that crystalline carbon and amorphous carbon are present together. Raman spectral distribution using an argon laser with a wavelength of 0.5145 nm depends upon degrees of crystallinity. Peaks at about 1580 $cm^{-1}$ correspond to a crystal structure of lamination-formed C planes while peaks at about 1360 $cm^{-1}$ correspond to an amorphous structure. The peaks at about 1580 $cm^{-1}$ refer to peaks in a range of 1570 to 1620 $cm^{-1}$, whereas the peaks at about 1360 $cm^{-1}$ refer to peaks in a range of 1350 to 1370 $cm^{-1}$. The higher a ratio of crystalline carbon to amorphous carbon, the lower a ratio of peak intensity at about 1360 $cm^{-1}$ to peak intensity at about 1580 $cm^{-1}$ of argon laser Raman spectrum (R value), whereas the higher a ratio of amorphous carbon, the higher the R value. However, when the ratio of amorphous carbon is higher, the initial characteristics will be deteriorated. Thus, a ratio of crystalline carbon to amorphous carbon must be selected so that the R value may be preferably 0.15 to 2.0. Particularly preferable is 0.3 to 1.2.

For the carbon particles before the mechanical pressure welding, :crystalline carbon and amorphous carbon can be used, but the crystalline carbon is more preferable. Since no negative electrode-active material with desired physical properties can be obtained particularly from carbon particles with smaller particle sizes and larger specific surface areas, said carbon particles must have a specific surface area of preferably not more than 100 $m^2/g$, more preferably 0.5 to 50 $m^2/g$. Said carbon particles must have a d002 to preferably 0.3350 to 0.3370 nm.

Carbon precursor for use in the present invention includes, for example, easily graphitizable precursors such as petroleum pitch, coal pitch, etc., and non-graphitizable precursors such as isotropic pitch, polyacrylonitrile, phenol resin, furan resin, etc., but the easily graphitizable precursors are preferable for better electroconductivity and initial characteristics.

The higher the specific surface area of negative electrode material, the larger the irreversible capacity, whereas the smaller the specific surface area, the more deteriorated a coatability. Thus, the specific surface area is preferably 1 to 100 $m^2/g$, particularly preferably 2 to 50 $m^2/g$.

Positive electrode-active material for use in the present invention includes composite oxides such as lithium cobalt oxide ($Li_xCoO_2$), lithium nickel oxide ($Li_xNiO_2$), lithium manganese oxide ($Li_xMn_2O_4$, $Li_xMnO_3$), lithium nickel cobalt oxide ($Li_xNi_yCo_{(1-x)}O_2$), etc., where $0 \leq x \leq 1.2$ and $0 \leq y \leq 1$. In other words, they are stoichiometric compositions, but may be oxides slightly deviated from the stoichiometric compositions. These materials have an average particle size of preferably 3 to 40 nm.

Electrolytic solution for use in the present invention includes a solution of a lithium salt as electrolyte in an organic solvent. The organic solvent includes, for example, butylene carbonate, propylene carbonate, diethyl carbonate, ethyl methyl carbonate, ethylene carbonate, dimethyl carbonate, methyl carbonate, 1,2-dimethoxyethane, 1,2-diethoxyethane, ethoxymethoxyethane, γ-butyrolactone, γ-valerolactone, dipropyl carbonate, tetrahydrofuran, 2-methyltetrahydrofuran, dioxane, dimethyl sulfoxide, sulfolane, methylsulfolane, acetonitrile, methyl acetate, methyl formate, etc., or solvent mixtures of at least two thereof.

Electrolyte for use in the present invention includes lithium salts such as lithium hexafluorophosphate ($LiPF_6$), lithium borofluoride ($LiBF_4$), lithium perchlorate ($LiClO_4$), lithium bis(trifluoromethyl-sulfonyl)imide ($LiN(CF_2SO_2)_2$), arsenic lithium hexafluoride ($LiAsF_6$), lithium trifluorometasulfonate ($LiCF_2SO_3$), etc. Particularly preferable are lithium hexafluorophosphate ($LiPF_6$), lithium borofluoride ($LiBF_4$), lithium perchlorate ($LiClO_4$) and lithium bis(trifluoromethylsulfonyl)imide($LiN(CF_2SO_2)_2$). Concentration of dissolved electrolyte in organic solvent is preferably 0.5 to 2 moles/l.

Electroconductive material for the positive electrode and the negative electrode for use in the present invention includes graphite, amorphous carbon and carbon mixture thereof, and has an average particle size of preferably not more than 30 $\mu$m and a specific surface area of preferably 1 to 300 $m^2$/g. Carbon short fibers, 0.1 to 10$\mu$m in diameter and 2 to 30 $\mu$m long, can be used as well. To maintain a higher electroconductivity, it is preferable to use graphite as an electroconductive material or an active material in the present negative electrode-active material, that is, to use a mixed negative electrode of the present negative electrode-active material and graphite, where a plurality of graphite species can be used, as mixed, beside the single species. On the other hand, metallic particles with less reactivity toward the electrolytic solution can be used as an electroconductive material as well. For example, Ni, Co, Fe, Cu, Ti, Cr and alloys containing these can be used for the negative electrode, whereas Ni, Co, Fe, Ti, Cr, Al and alloys containing these can be used for the positive electrode. These metallic particles are hard to undergo deformation of particles by a press and the coatability will be poorer with increasing particle sizes. Thus, they must have an average particle size of preferably not more than 30 $\mu$m.

Binder plays a role in connecting an electroconductive material to a current collector. Binder for use in the present invention includes such resins as poly(vinylidene fluoride) (PVDF), ethylenepropylenediene copolymer (EPDM), polytetrafluoroethylene (PTFE), polyethylene, polypropylene, polystyrene, polyvinylpyridine, chlorosulfonated polyethylene, latex, etc. On the basis of total mix consisting of the active material, the electroconductive material and the binder, an amount of the binder is preferably 2 to 20% by weight. Particularly, the amount of the binder for the positive electrode is more preferably 2 to 10% by weight, whereas that for the negative electrode is more preferably 5 to 15% by weight.

Current collector for use in the negative electrode includes foils and sponge metals of Cu, Ni or stainless steel, whereas that for use in the positive electrode includes foils and sponge metals of Al, Ni or stainless steel. Generally, a combination of a negative electrode current collector of Cu with a positive electrode current collector of Al is preferable. It is preferable from the viewpoint of high strength that these foils are rolled ones, but electrolytic foils can be used as well. The foils have a thickness of preferably not more than 100 $\mu$m, particularly preferably 8 to 40 $\mu$m.

Separator for use in the present invention includes sheet separators and polymer electrolytes both having a low resistance to the ion conductivity of electrolytic solution, no reactivity toward the electrolytic solution and a distinguished solution retainability. The sheet separators for use in the present invention include, for example, porous films of polypropylene, polyethylene, polyolefin, polyester, polytetrafluoroethylene, polyflon, etc. and non-woven fabrics of glass fibers with said polymers. Particularly preferable are porous films of polypropylene, polyethene and polyolefin. Polymer electrolytes for use in the present invention include composites comprising a polymer matrix selected from polyethylene oxide, polypropylene oxide, poly(vinylidene fluoride), polyacrylamide, etc. and said electrolyte as dissolved in the polymer matrix, gel crosslinked matrices further containing a solvent, polymer electrolytes grafted with ionically dissociated groups of low molecular weight polyethylene oxide, crown ether, etc. on the polymer main chains and gel state polymer electrolytes comprising a high polymer containing said electrolyte therein.

In mechanical pressure welding of carbonaceous particles and oxide particles it is necessary to apply such an external force thereto as to make said particles bonding to one another, and an apparatus capable of doing such actions must be used. The apparatus for this purpose includes, for example, a planetary type ball mill capable of giving mechanical pressure welding when balls collide with one another or with the vessel wall, an apparatus capable of giving mechanical pressure welding between the vessel and the pressure welding spatula provided at a given distance, etc. In said apparatus, the carbonaceous particles and the oxide particles can be subjected to repetitions of mechanical pressure welding, thereby embedding said particles in the carbonaceous materials. In that case, when the pressure welding is carried out for a long time, the specific surface area can be radically increased, whereas, when for a short time, embedding of said particles in the carbonaceous material will be unsatisfactory, resulting in loss of desired characteristics. After repetitions of mechanical pressure welding, heat treatment can be further carried out at temperatures of 700 to 1,200° C., but the heat treatment is not always imperative. It is preferable to carry out the heat treatment at temperatures of 700 to 1,200° C., particularly 900 to 1,100° C. The heat treatment can be carried out in any atmosphere, such as in an inert gas, a nitrogen gas or in vacuum, so long as it can prevent any oxidation.

Embedment treatment by a carbon precursor can be carried out by mixing a carbon precursor, oxide particles and a solvent such as tetrahydrofuran, etc. with stirring under refluxing, removing the solvent therefrom in a drying step and carbonizing the residues at a given temperature. Carbonization temperature of the carbon precursor is preferably 800 to 1,500° C., particularly 900 to 1,200° C. The carbonization is carried out in such an atmosphere as an inert gas or a nitrogen gas.

Active material containing the oxide particles as embedded in the carbonaceous material by pressure welding or further by heat treatment can be used as a negative electrode-active material as such. The active material subjected to the pressure welding has a relatively high specific surface area, and thus the characteristics can be further improved by further mixing with a carbon precursor and successive carbonization at temperatures of 800 to 1,500° C. The carbonization temperature is preferably 800 to 1,500° C., particularly 900to 1,200° C. The carbonization is carried out preferably in such an atmosphere as an inert gas or a nitrogen gas.

The present lithium secondary battery comprises an electrode assembly formed by lamination from a positive electrode comprising a positive electrode-active material, a positive electrode electroconductive material, a binder and a positive electrode current collector, a negative electrode comprising a negative electrode-active material, a binder, a negative electrode current collector or further a negative electrode current collector, and a separator inserted between the positive electrode and the negative electrode; an electrolytic solution; and a battery container for tightly enclosing the electrode assembly and the electrolytic solution, connected to the electrode assembly. The electrode assembly can be in a lamination structure of the positive electrode, the separator and the negative electrode, with tabs stuck out from the respective electrodes, or a laminate-coiled structure of the respective electrodes in a tab-connected strip form, or a laminate-wound and subsequently flattened structure of the respective electrodes in a tab-fixed strip form. In other words, any structure can be used, so long as the battery has an electrode assembly with a separator inserted between the counterposed positive and negative electrodes.

The present invention provides a negative electrode material for a lithium secondary battery, characterized by comprising a composite powder comprising particles of carbonaceous material and lithium ion interstitially diffusible/releasable particles selected from at least one of metal particles and metal oxide particles capable of enhancing a lithium ion interstitial diffusibility/releasability to/from the carbonaceous material between a positive electrode and a negative electrode when charged/discharged, at least 50% by weight of the interstitially diffusible/releasable particles being embedded in the carbonaceous material, and the interstitially diffusible/releasable particles having an average particle size of not more than 50 $\mu$m and particle sizes of not more than 10 $\mu$m for at least 90% by weight thereof or the composite powder having particle sizes of not more than 50 $\mu$m for at least 90% by weight thereof.

The present invention provides a negative electrode material for a lithium secondary battery, characterized by comprising a composite powder comprising graphite particles and lithium ion interstitially diffusible/releasable particles selected from at least one of metal particles and metal oxide particles capable of enhancing a lithium ion interstitial diffusibility/releasability to/from the graphite between a positive electrode and a negative electrode when charged/discharged, at least 50% by weight is the interstitially diffusible/releasable particles being embedded in the graphite particles, and the graphite particles comprising at least one of not less than 80% by weight of hexagonal crystals and not more than 20% by weight of rhombohedral crystals.

Graphite powder for use in the present invention includes powders of natural graphite and artificial graphite. Particularly preferable is scale-formed natural graphite.

Pulverizing apparatus for pulverizing raw material graphite to particle sizes of not more than 100 $\mu$m is preferably a jet mill, because of less yield of amorphous carbon.

Pulverized graphite powder contains about 30% of graphite in the rhombohedral crystal structure. In the present invention, proportion of the rhombohedral crystal structure can be reduced by heating the raw material powder at 900° C. or higher. It is preferable that the rhombohedral crystals are reduced by heating more preferably at 2,000° C. or higher, particularly at 2,700° C. or higher for at least 3 days. Heating is carried out preferably in an inert gas or in vacuum.

The graphite powder obtained by pulverization can be also treated in an acidic solution containing at least one member selected from the group consisting of sulfuric acid, nitric acid, perchloric acid, phosphoric acid and hydrofluoric acid, followed by water washing, neutralization and drying, whereby the proportion of rhombohedral crystals in the hexagonal crystals can be likewise reduced.

The present secondary battery based on a non-aqueous electrolytic solution has a higher capacity and a longer life than those of the conventional secondary batteries.

The present lithium secondary battery can be used as a power source for various portable electronic appliances or electric appliances, particularly, notebook-type personal computers, notebook-type word processors, palm-top (pocket) personal computers, portable telephones, PHS, portable facsimiles, portable printers, headphone stereos, video cameras, portable television receivers, portable CD players, portable MD players, electric shavers, electronic notebooks, transceiver, electric tools, radios, tape recorders, digital cameras, portable copiers, portable video games, etc. or further electric cars, hybrid cars, automatic vendors, electric carts, road leveling battery systems, household batteries, spread-type power storing systems (encased in installation-type electric appliances), emergency power supply systems, etc.

It is preferable that the present lithium secondary battery is provided with a protective means against overcharging and overdischarging.

The present invention is illustrated by way of the following Examples, but not limited thereto.

EXAMPLE 1

Amorphous SiO particles having an average particles size of 10 $\mu$m and natural graphite particles having an average particle size of 20 $\mu$m were joined together in a ratio of 70:30 by weight and subjected to a ball mill treatment based on repetitions of mechanical pressure welding in a planetary ball mill for 12 hours. Ball mill vessel and balls, 10 mm in diameter, are made of stainless steel, and the powder preparation and the ball mill treatment were carried out in an Ar atmosphere. Furthermore, a heat treatment was carried out at 1,100° C. for one hour in an Ar atmosphere. Analysis of the resulting SiO-graphite composite powder by wide angle X-ray diffraction revealed that the d002 of graphite was 0.3358 nm. Lc and R value were also found to be 45 nm and 0.5, respectively. Results of observing the cross-sections of said composite powder revealed that SiO particles were embedded in the graphite particles and had an average particle size of 1.2 $\mu$m and particle sizes of not more than 10 $\mu$m for at least 95% by weight of the whole. Furthermore, it was found that the SiO-graphite composite powder had a specific surface area of 63 m$^2$/g and particle sizes of not more than 40 $\mu$m for at least 95% by weight. The SiO-graphite composite powder was mixed with a solution of PVDF in N-methylpyrrolidone by kneading so as to make a ratio of SiO-graphite composite powder:PVDF=85:15 by weight, and the resulting mixture was applied to a 20 $\mu$m-thick Cu foil and dried at 120° C. for one hour, followed by press molding into an electrode by a roller press and ultimately blanking to 20 mm in diameter as a negative electrode. The graphite contained about 3% by weight of amorphous carbides.

For the positive electrode-active material, LiCoO$_2$ powder having an average particle size of 10 $\mu$m was used. The LiCoO$_2$ powder, graphite particles and PVDF were mixed so as to make a ratio of LiCoO$_2$ powder: graphite:PVDF= 90:6:4 by weight, whereby a slurry was formed. In this case, a solution of PVDF in N-methylpyrollidone was used as in case of the negative electrode. The slurry was thoroughly kneaded, then applied to a 20 $\mu$m-thick Al foil, and dried at 120° C. for one hour, followed by press molding into an electrode by a roller press and ultimately blanking to 20 mm in diameter as a positive electrode. A ratio of the positive electrode mix to the negative electrode mix by weight was made 7 owing to the large negative electrode a capacity.

A coin type battery, as shown in FIG. 1, was made from said negative electrode and said positive electrode to evaluate its characteristics. A positive electrode 2 comprising a positive electrode current collector 2a and a positive electrode mix 2b was mounted on a stainless steel positive electrode can 1 by spot welding, whereas a negative electrode 4 comprising a negative electrode current collector 4a and a negative electrode mix 4b was mounted on a stainless steel negative electrode can 3 by spot welding. Both the positive electrode and the negative electrode were impregnated with an electrolytic solution containing 1 mole/l of $LiPF_6$ dissolved in a 1:2 solvent mixture of ethylene carbonate (EC) and dimethyl carbonate (DMC), and then the positive electrode and the negative electrode were counterposed to each other, while interposing a polyethylene separator 5 therebetween, and the positive electrode can and the negative electrode can were fixed to each other by pressure welding through an insulating gasket 6.

The resulting battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery as 7.3 mAh and the irreversible capacity ratio was 23%. On the other hand, a discharge capacity maintenance ratio of 100th cycle to the 1st cycle was found to be 87%.

EXAMPLE 2

Amorphous SiO particles having an average particle size of 10 μm and natural graphite particles having an average particle size of 20 μm were joined together in a ratio of 80:20 by weight and were subjected to a ball mill treatment for 48 hours using the same planetary ball mill as in Example 1. The powder preparation and the ball mill treatment were carried out in an Ar atmosphere. Analysis of the resulting SiO-graphite composite powder by wide angle X-ray diffraction revealed that the d002 of graphite was 0.3367 nm. Lc and R value were also found to be 30 nm and 0.8, respectively. Results of observing the cross-section of said composite powder revealed that SiO particles were embedded in the graphite particles and had an average particle size of 0.8 μm and particle sizes of not more than 10 μm for at least 98% by weight. Furthermore, it was found that the SiO-graphite composite powder had a specific surface area of 49 m$^2$/g and particle sizes of not more than 40 μm for at least 98% by weight.

Said SiO-graphite composite powder, petroleum pitch and tetrahydrofuran were mixed together in a ratio of 100:30:300 by weight and stirred under reflux for one hour. The tetrahydrofuran was removed from the mixture in a rotary evaporator, followed by vacuum drying at 150° C. for 3 hours, thereby obtaining a SiO-graphite composite/pitch composite material. The composite material was disintegrated to 200-mesh and under in a cutter mill, and then heated up to 250° C. in air at a rate of 3° C./min and kept at that temperature for one hour. The resulting product was heated up to 1,100° C. in a nitrogen gas stream at a rate of 20° C./h and kept at that temperature for one hour, thereby carbonizing the pitch. The carbonization product was disintegrated to 200-mesh and under in a cutter mill to obtain SiO-graphite-pitch composite powder. As a result of analysis of the resulting SiO-pitch composite powder by X-ray diffraction, two peaks, i.e. 0.3368 nm and 0.3435 nm were observed as the d002 of the graphite. R value was also found to be 1.0. The SiO-graphite-pitch composite powder had a specific surface area of 28 m$^2$/g. Si and SiC due to the heating up to 1,100° C. were detected in small amounts.

A battery using said SiO-pitch composite powder as a negative electrode-active material was produced in the same manner as in Example 1. For the positive electrode material, $LiNi_{0.8}Co_{0.2}O_2$ having an average particle size of 10 μm was used. As the electrolytic solution, a solution containing 1 mole/l of $LiPF_6$ dissolved in a 3:6:1 solvent mixture of EC, DMC and DEC was used.

The battery was subjected to a charging/discharging cycle test by charging with a charge current of 1 mA at a charge end voltage of 4.15 V and discharging with a discharge current of 2 mA at a discharge end voltage of 2.8 V. As a result, it was found that the initial charge capacity of the battery was 6.8 mAh and a ratio of the irreversible capacity was 13%. On the other hand, a discharge capacity maintenance ratio of 100th cycle to 1st cycle was found to be 92%.

EXAMPLE 3

Crystalline $SnO_2$ particles having an average particle size of 20 μm and natural graphite particles having an average particle size of 10 μm were joined together and subjected to a planetary ball mill treatment for 6 hours. The ball mill vessel and balls, 10 mm in diameter, were made from stainless steel, and the powder preparation and the ball mill treatment were carried out in an Ar atmosphere. Further heat treatment was carried at in Ar at 900° C. for 5 hours. Results of analysis of the resulting $SnO_2$-graphite composite powder by wide angle X-ray diffraction revealed that the d002 of carbon was 0.3355 nm. Lc and R value were also 60 nm and 0.4, respectively. As a result of observing the cross-sections of said composite powder, it was found that the $SnO_2$ particles were embedded in the graphite particles and $SnO_2$ had an average particle size of 2.3 μm. The $SnO_2$-graphite composite powder had a specific surface area of 43 m$^2$/g.

Said $SnO_2$-graphite composite powder, graphite powder having an average particle size of 15 μm and PVDE were mixed together to prepare a slurry in a ratio of 45:45:10 by weight, and the slurry was thoroughly kneaded and made into a negative electrode in the same manner as in Example 1. A coin-type battery was produced therefrom in the same manner as in Example 1, where $LiMn_2O_4$ having an average particle size of 10 μm was used as a positive electrode material.

The battery was subjected to a charging/discharging cycle test by charging with a charge current 1 mA at a charge end voltage of 4.3 V and discharging with a discharge current of 1 mA at a discharge end voltage of 2.8 V. As a result, it was found that the initial discharge capacity of the battery was 4.2 mAh and the irreversible capacity ratio was 17%. On the other hand, a discharge capacity maintenance ratio of 100th cycle to 1st cycle was found to 94%.

EXAMPLE 4

Amorphous $SnSi_{0.9}Ge_{0.1}O_3$ particles having an average particle size of 10 μm and natural graphite particles having an average particle size of 10 μm were joined together in a ratio of 80:20 by weight and subjected to the same ball mill treatment as in Example 1 for 150 hours. The ball mill vessel and balls were made from stainless steel, and the powder preparation and the ball mill treatment were carried out in an Ar atmosphere. Said $SnSi_{0.9}Ge_{0.1}O_3$-graphite composite powder, coal pitch and tetrahydrofuran were mixed together in a ratio of 100:30:300 by weight, and stirred under reflux for one hour. The tetrahydrofuran was removed therefrom in a rotary evaporator, followed by vacuum drying at 150° C. for 3 hours, thereby obtaining a Ge-graphite composite/pitch composite material. The composite material was disintegrated to 200-mesh and under by a cutter mill and heated up to 350° C. in air at a rate of 3° C./min and kept at that temperature for one hour. Then, the composite material was heated up to 1,000° C. in a nitrogen gas stream at a rate of 20° C./h and kept at that temperature for one hour, thereby carbonizing the pitch. The carbonization product was disintegrated to 200-mesh and under by a cutter mill, thereby obtaining $SnSi_{0.9}Ge_{0.1}O_3$-pitch composite powder. Results of analyzing the resulting $SnSi_{0.9}Ge_{0.1}O_3$-pitch composite powder by wide angle X-ray diffraction revealed that the d002 of carbon was 0.3398 nm. An average particle size of $SnSi_{0.9}Ge_{0.1}O_3$ determined by cross-sectional observation was 0.6 µm. R value was also found to be 1.0. A specific surface area of the $SnSi_{0.9}Ge_{0.1}Ge_{0.1}O_3$-pitch composite powder was found to be 24 m²/g. The $SnSi_{0.9}Ge_{0.1}O_3$ particles were found to be embedded in the graphite particles and had particle sizes of not more than 10 µm for at least 99% by weight.

A battery using said $SnSi_{0.9}Ge_{0.1}O_3$-pitch composite powder was a negative electrode-active material was produced in the same manner as in Example 1. As an electrolytic solution, a solution containing 1.2 moles/l of $LiPF_6$ in a 2:3 solvent mixture of PC and DMC was used.

The battery was subjected to a charging/discharging cycle test by charging with a charge current of 1.5 mA at a charge end voltage of 4.2 V and discharging with a discharge current of 1.5 mA at a discharge end voltage of 2.7 V. As a result, it was found that the initial discharge capacity of the battery was 4.1 mAh and the irreversible capacity ratio was 15%. On the other hand, a discharge capacity maintenance ratio of 100th cycle to 1st cycle was found to be 93%.

EXAMPLE 5

Amorphous $SnSiO_3$ particles having an average particle size of 110 µm and natural graphite particles having an average particle size of 20 µm were joined together in a ratio of 30:70 by weight and subjected to the same ball mill treatment as in Example 1 for 48 hours. The powder preparation and the ball mill treatment were carried out in an Ar atmosphere. Said $SnSiO_3$-graphite composite powder, petroleum pitch and tetrahydrofuran were mixed together in a ratio of 100:70:700 by weight and stirred under reflux for one hour. The tetrahydrofuran was removed therefrom in a rotary evaporator, followed by vacuum drying at 150° C. for 3 hours. The resulting composite material was disintegrated to 200-mesh and under by a cutter mill, then heated up to 350° C. in air at a rate of 3° C./min and kept at that temperature for one hour. Then, the product was heated up to 1,100° C. in a nitrogen gas stream at a rate of 20° C./h and kept at that temperature for one hour, thereby carbonizing the pitch. The carbonization product was disintegrated to 200-mesh and under by a cutter mill, thereby obtaining $SnSiO_3$-graphite-pitch composite powder. Results of analyzing the resulting $SnSiO_3$-graphite-pitch composite powder by wide angle X-ray diffraction revealed that the d002 of graphite was 0.3361 nm and 0.3378 nm. An average particle size of $SnSiO_3$ determined by cross-sectional observation was found to be 2.2 µm. R value was also found to be 1.3. A specific surface area of the $SnSiO_3$-graphite-pitch composite powder was found to be 20 m²/g.

A battery using said $SnSiO_3$-pitch composite powder as a negative electrode-active material was produced in the same manner as in Example 1. As an electrolytic solution, a solution containing 1.5 moles/l of $LiPF_6$ in a 1:2 solvent mixture of EC and DMC was used.

The battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 3.5 mAh and the irreversible capacity ratio was 9%. On the other hand, a discharge capacity maintenance ratio of 100th cycle to 1st cycle was found to be 95%.

EXAMPLE 6

Amorphous SiO particles having an average particle size of 1 µm, petroleum pitch and tetrahydrofuran were mixed together in a ratio of 100:50:500 and stirred under reflux for one hour. The tetrahydrofuran was removed therefrom in a rotary evaporator, followed by vacuum drying at 150° C. for 3 hours, theteby obtaining a SiO/pitch composite material. The composite material was disintegrated to 200-mesh and under by a cutter mill, heated up to 250° C. in air at a rate of 3° C./min and kept at that temperature for one hour. Then, the mixture was heated up to 900° C. in a nitrogen gas stream at a rate of 20° C./h and kept at that temperature for one hour, thereby carbonizing the pitch. The carbonization product was disintegrated to 200-mesh and under by a cutter mill, thereby obtaining SiO-carbon composite powder. Results of analyzing the resulting SiO-carbon composite powder by wide angle X-ray diffraction revealed that the d002 of carbon was 0.3610 nm. Lc and R value were also found to be 5 nm and 1.4, respectively. The SiO-carbon composite powder had a specific surface area of 7 m²/g and the SiO particles were found to be:embedded in the carbon particles.

A battery using said SiO-carbon composite powder as a negative electrode-active material was produced in the same manner as in Example 1. As an electrolytic solution, a solution containing 1.0 mole/l of $LiPF_6$ dissolved in a 1:2 solvent mixture of Ec and DMC was used.

The battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 7.2 mAh and the irreversible capacity ratio was 20%. On the other hand, a discharge capacity maintenance ratio of 100th cycle to 1st cycle was found to be 88%.

COMPARATIVE EXAMPLE 1

Amorphous SiO particles having an average particle size of 1 µm, petroleum pitch and tetrahydrofuran were mixed together in a ratio of 100:50:500 by weight and stirred under reflux for one hour. The tetrahydrofuran was removed therefrom in a rotary evaporator, followed by vacuum drying at 150° C. for 3 hours, thereby obtaining a SiO/pitch composite material. The composite material was disintegrated to 200-mesh and under by a cutter mill, heated up to 250° C. in air at a rate of 3° C./min and kept at that temperature for one hour. Then, the mixture was heated up to 700° C. in a nitrogen gas stream at a rate of 20° C./h and kept at that temperature for one hour, thereby carbonizing the pitch. The carbonization product was disintegrated to 200-mesh and under by a cutter mill, thereby obtaining SiO-pitch composite powder. Results of analyzing the resulting SiO-pitch composite powder by wide angle X-ray diffraction reveal that the d002 of carbon was 0.3691 nm. R value was also found to be 1.7. The SiO-pitch composite powder had a specific surface area of 7 m²/g.

A battery using said SiO-carbon composite powder as a negative electrode-active material was produced in the same manner as in Example 1. As an electrolytic solution, a solution containing 1.0 mole/l of $LiPF_6$ dissolved in a 1:2 solvent mixture of EC and DMC was used.

The battery was subjected to a charging/discharging cycle test by charging with a charge current of 1 mA at a charge end voltage of 4.2 V and discharging with a discharge current of 1 mA at a discharge end voltage of 2.7 V. As a result, it was found that the initial discharge capacity of the battery was 7.8 mAh and the irreversible capacity ratio was 45%. On the other hand, a discharge capacity maintenance ratio of 100th cycle to 1st cycle was found to be 56%.

COMPARATIVE EXAMPLE 2

Crystalline $SnO_2$ having an average particle size of 10 μm, natural graphite powder having an average particle size of 15 μm and PVDF were mixed together in a ratio of 30:60:10 by weight to make a slurry, and the slurry was thoroughly kneaded. A negative electrode was produced therefrom in the same manner as in Example. Furthermore, a coin-type, battery was produced in the same manner as in Example 1. For the positive electrode material, $LiMn_2O_4$ having an average particle size of 10 μm was used.

The battery was subjected to a charging/discharging cycle test by charging with a charge current of 1 mA at a charge end voltage of 4.3 V and discharging with a discharge current of 1 mA at a discharge end voltage of 2.8 V. As a result, it was found that the initial discharge capacity of the battery was 3.7 mAh and the irreversible capacity ratio was 36%. On the other hand, a discharge capacity maintenance ratio of 100th cycle to 1st cycle was found to be 20%.

EXAMPLE 7

Figure 2:
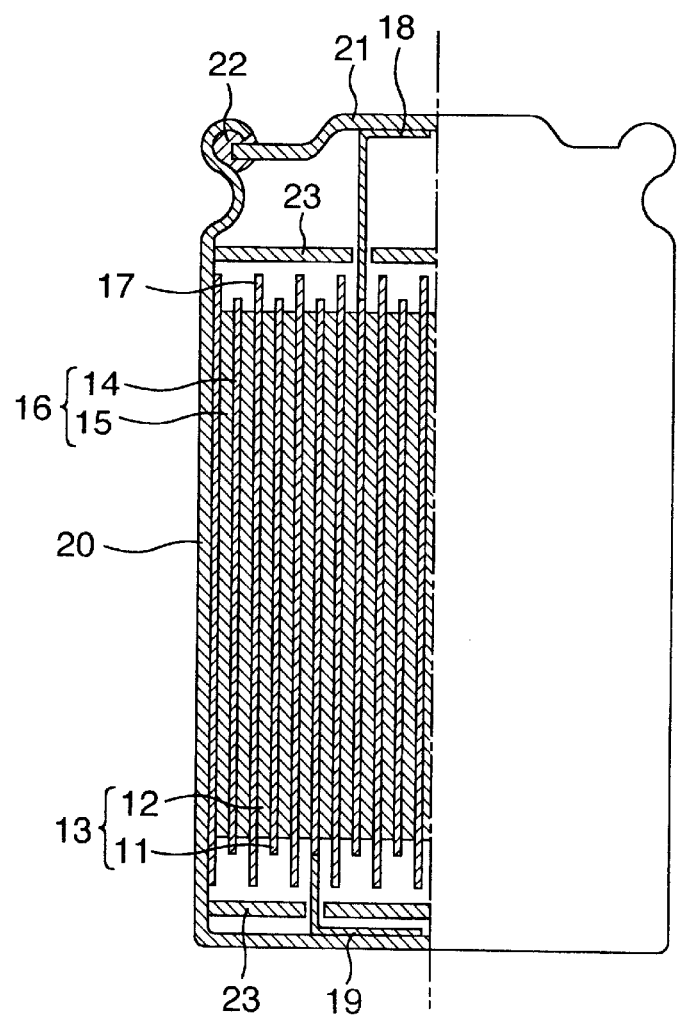
FIG. 2 is a cross-sectional schematic view of the present lithium secondary battery.
Figure 3:
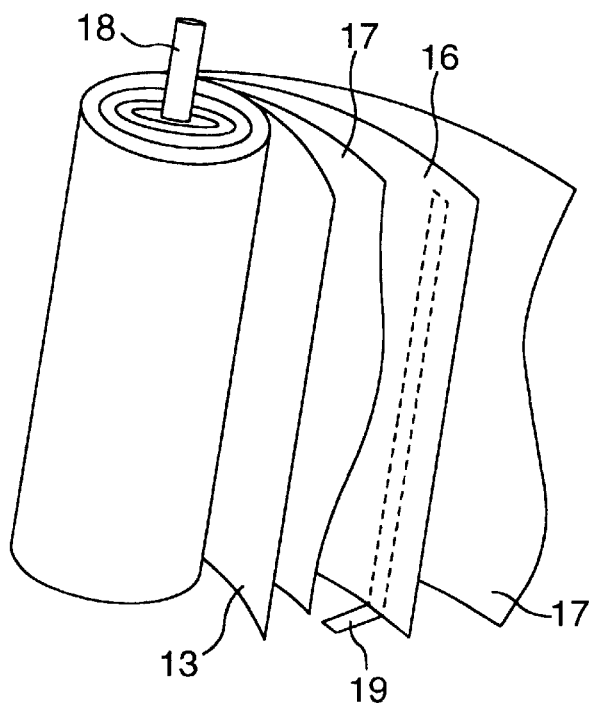
FIG. 3 is an assembly view of positive electrode, negative electrode and separator for the present lithium secondary battery.

A cylindrical lithium secondary battery was produced as a lithium secondary battery according to the present invention, and its basic structure is shown in FIG. 2. An electrode assembly comprises a positive electrode 13 comprising a positive electrode current collector 11 coated with a positive electrode mix 12, a negative electrode 16 comprising a negative electrode current collector 14 coated with a negative electrode mix 15, and separators 17. The positive electrode 13, the separator 17, the negative electrode 16 and the separator 17 are laminated in this order and coiled as shown in FIG. 3. A positive electrode tab 18 and a negative electrode tab 19 are connected to the positive electrode 13 and the negative electrode 16 of the electrode assembly, respectively. The electrode assembly is encased in a battery can 20, where the negative electrode tab 19 is connected to the battery can 20, whereas the positive electrode tab 18 is connected to a battery lid 21 is connect. The battery lid 21 is fixed to the battery can 20 through an isolating gasket 22 to tightly seal the electrode assembly and the inside of the battery can 20. To prevent any contact of the electrode assembly to the battery can 20 or the battery lid 21, an insulating plate 23 is also provided. An electrolytic solution containing Li ions is contained in the tightly sealed battery can. For the battery can 20 and the battery lid 21, SUS 304, SUS 316, mild steel with an anticorrosive coating, etc. can be used.

$LiCoO_2$ having an average particle size of 10 μm as a positive!.electrode-active material, scale form graphite having an average particle size of 5 μm as a positive electrode electroconductive material, PVDF as a binder and a 20 μm-thick Al foil as a positive electrode current collector were used. A mixture of $LiCoO_2$, scale form graphite and PVDF in a ratio of 88:7:5 by weight was mixed with N-methylpyrrolidone to prepare a slurry of positive electrode mix. The slurry was applied to both sides of the Al foil, followed by vacuum drying at 120° C. for one hour, and successive press molding into an electrode piece by a roller press. Then, a strip, 40 mm wide and 285 mm long, was cut out of the electrode piece to prepare a positive electrode, where the Al foil was exposed in 10 mm-long, positive electrode mix-uncoated regions at both edges of the positive electrode. A Ni positive electrode tab was pressure welded to one end of the positive electrode by ultrasonic welding.

Negative electrode-active material was prepared in the following manner. Amorphous SiO particles having an average particle size of 10 μm and natural graphite particles having an average particle size of 20 μm were joined together in a ratio of 80:20 by weight and subjected to a ball mill treatment for 48 hours. The ball mill vessel and balls were made from stainless steel, and the powder preparation and ball mill treatment were carried in an Ar atmosphere. Said SiO-carbon composite powder, petroleum pitch and tetrahydrofuran were mixed together in a ratio of 100:50:500 by weight and stirred under reflux for one hour. The tetrahydrofuran was removed therefrom in a rotary evaporator, followed by vacuum drying at 150° C. for 3 hours, thereby obtaining SiO-graphite-pitch composite material. The composite material was disintegrated to 200-mesh and under by a cutter mill, heated up to 250° C. in air at a rate of 3° C./min and kept at that temperature for one hour. The product was backed up to 1,100° C. in a nitrogen gas stream at a rate of 200/h and kept at that temperature for one hour, thereby carbonizing the pitch. The carbonization product was disintegrated to 200-mesh and under by a cutter mil, thereby obtaining SiO-pitch composite powder. The resulting SiO-graphite-pitch composite powder was used as a negative electrode-active material. Results of analyzing said negative electrode-active material by wide angle X-ray diffraction revealed that the d002 of carbon was 0.3358 nm. Lc was also found to be 33 nm. An average particle size of SiO determined by cross-sectional observation was found to be 1.8 μm. R value and a specific surface area were found to be 1.3 and 15 $m^2/g$, respectively.

Said negative electrode-active material, scale-formed natural graphite having an average particle size of 10 μm as ,a negative electrode electroconductive material, carbon fibers having an average particle size of 0.2 μm and an-average length of 30 μm, PVDE as a binder and a 20 μm-thick Cu foil as a negative electrode current collector were used. A mixture of the negative electrode-active material, scale-formed graphite, carbon fibers and PVDF in a ratio of 55:30:5:10 by weight was mixed with N-methylpyrrolidone to prepare a slurry of negative electrode mix. The slurry was applied to both sides of the Cu foil, followed by vacuum drying at 120° C. for one hour and subsequent press molding into an electrode piece by a roller press. Then, a negative electrode, 40 mm wide and 290 mm long, was cut out of the electrode piece, thereby preparing the negative electrode. A ratio of the applied negative electrode mix to the applied positive electrode mix was 1:4.2 by weight. The Cu foil was exposed in 10 mm-long, negative electrode mix-uncoated regions at both edges of the negative electrodes. A Ni negative electrode tab was pressure welded to one end of the negative electrode by ultrasonic welding.

A porous polypropylene film, 25 μm thick and 44 mm wide, was used as a separator. As an electrolytic solution, a solution containing 1 mole/l of $LiFP_6$ dissolved in a 1:2 solvent mixture of EC and DMC was used.

The battery was subjected to repetitions of charging/ discharging with a charge/discharge current of 300 mA at a charge end voltage of 4.2 V and a discharge end voltage of 2.8 V. As a result, a maximum discharge capacity was found to be 1,150 mAh, and a discharge capacity maintenance ratio of 200th cycle to the maximum discharge capacity was found to be 86%.

COMPARATIVE EXAMPLE 3

For comparison, scale-formed natural graphite having an average particle size of 20 μm was used for the negative electrode-active material. A negative electrode was prepared by adjusting a ratio of the negative electrode-active material to PVDF to 90:10 by weight, and a lithium secondary battery was produced in the same manner as in Example 9, where a ratio of the negative electrode mix to the positive electrode mix was 1:2.3 by weight.

The battery was subjected to repetitions of charging/discharging with a charge/discharge current of 300 mA at a charge end voltage of 4.2 V and a discharge end voltage of 2.8 V. As a result, a maximum discharge capacity was found to be 734 mAh. A discharge capacity maintenance ratio of 200th cycle to the maximum discharge capacity was found to be 85%.

The results show that the present lithium secondary battery has a higher capacity and also equivalent or superior characteristics, as compared with the conventional ones.

EXAMPLE 8

A square type battery was produced as the present lithium secondary battery.

A mixture of $Li_{1.09}Mn_{1.91}O_4$ having an average particle size of 10 μm, scale-formed natural graphite and PVDF in a ratio of 90:6:4 by weight was mixed with N-methylpyrrolidone and thoroughly kneaded to prepare a slurry. The slurry was applied to both sides of a 20 μm-thick Al foil by a doctor blade method and dried at 100° C. for 2 hours. The positive electrode was in a strip form, 70 mm×120 mm.

For the negative electrode-active material, SiO-graphite-pitch composite powder was prepared in the same manner as in Example 7. Said negative electrode material, PVDF as a binder and a 20 μm-thick Cu foil as a negative electrode current collector were used. For the negative electrode electroconductive material, scale-formed graphite having an average particle size of 10 μm, carbon fibers having an average diameter of 0.2 pm and an average length of 30 μm, PVDF as a binder and a 20 μm-thick Cu foil as a negative electrode current collector were used. A mixture of the negative electrode-active material, the scale-formed graphite, the carbon fibers and PVDF in a ratio of 55:30:5:10 by weight was mixed with N-methylpyrrolidone to prepare a slurry of negative electrode mix. The slurry was applied to both sides of the Cu foil and dried at 100° C. for 2 hours., The negative electrode was in a strip form, 70 mm×120mm.

Figure 4A:
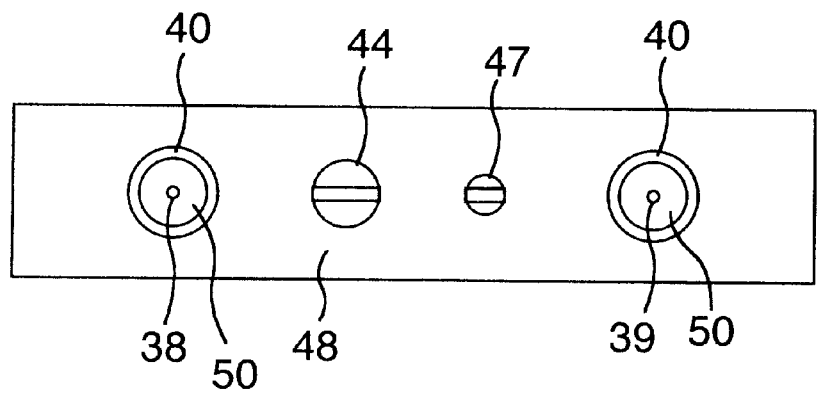
FIG. 4 is a top view and cross-sectional schematic view of the present square type lithium secondary battery.
Figure 4B:
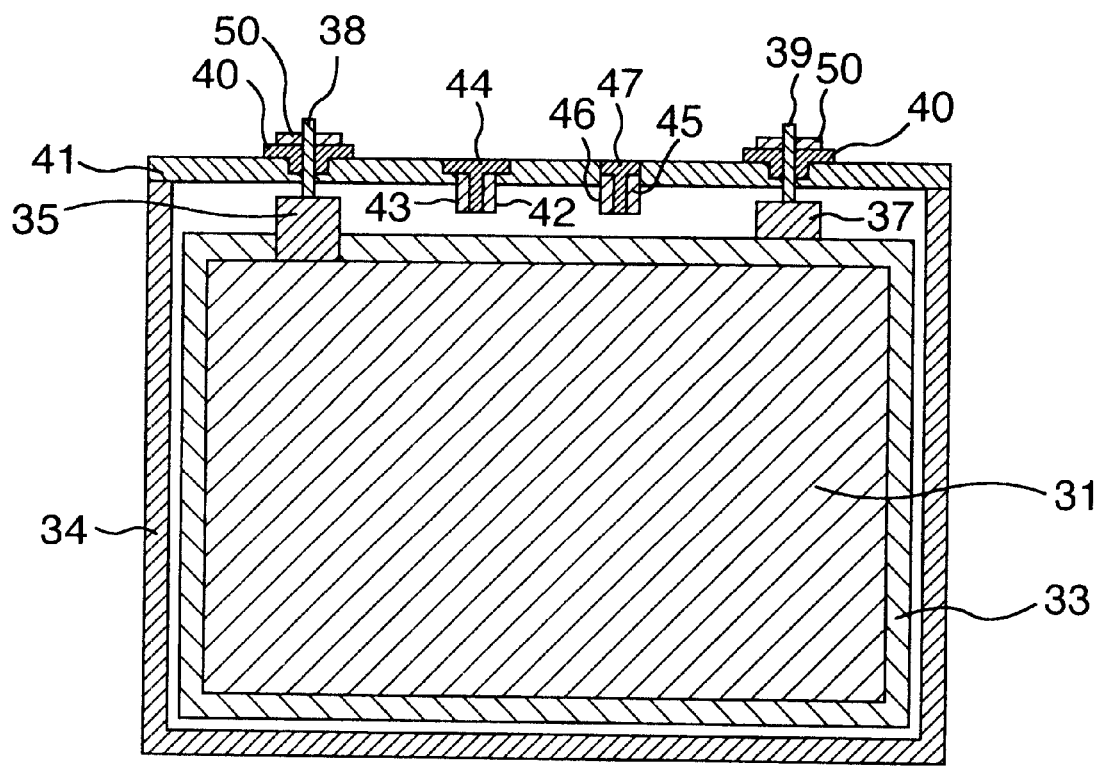

FIG. 4 shows a top view (a) and a cross-sectional view (b) of the square type lithium secondary battery. The battery had such outside dimensions as 100 mm high, 130 mm wide and 30 mm deep. An electrode assembly comprising positive electrodes 31 and negative electrodes 32 as alternately laminated in a bag-formed polyethylene separator 33 was inserted into an Al battery can 34, where a ratio of positive electrode mix to negative electrode mix was 5:1 by weight. Positive electrode leads 35 and negative electrodes 37 welded to the tops of the respective corresponding electrodes were connected to a positive electrode terminal 38 and a negative electrode terminal 39, respectively. The positive electrode terminal 38 and the negative electrode 39 were inserted into a battery lid 41 through polypropylene packings 40. An external case and the battery can be connected to each other by nuts 50 provided at the positive electrode terminal 38 and the negative electrode terminal 39, respectively. The battery lid 41 was provided with a safety valve for discharging a gas,accumulated in the battery when the pressure in the battery reaches 4 to 7 atmospheres, and an electrolytic solution inlet. The safety valve comprised a gas discharge outlet port 42, an O-ring 43 and a sealing bolt 44. The electrolytic solution inlet comprised an inlet port 45, an O-ring 46 and a sealing bolt. After laser welding of the battery can 34 to the battery lid 41, an electrolytic solution was introduced therein through the inlet port 45 and then the inlet port 45 was tightly closed by the sealing bolt 47, thereby completing the square type, lithium secondary battery. The electrolytic solution used was a solution containing 1 mole/l of $LiPF_6$ dissolved in a 1:2 solvent mixture of EC and DMC. The battery had an average discharge voltage of 3.4 V and a rated capacity of 38 Ah with 130 Wh.

Figure 5:
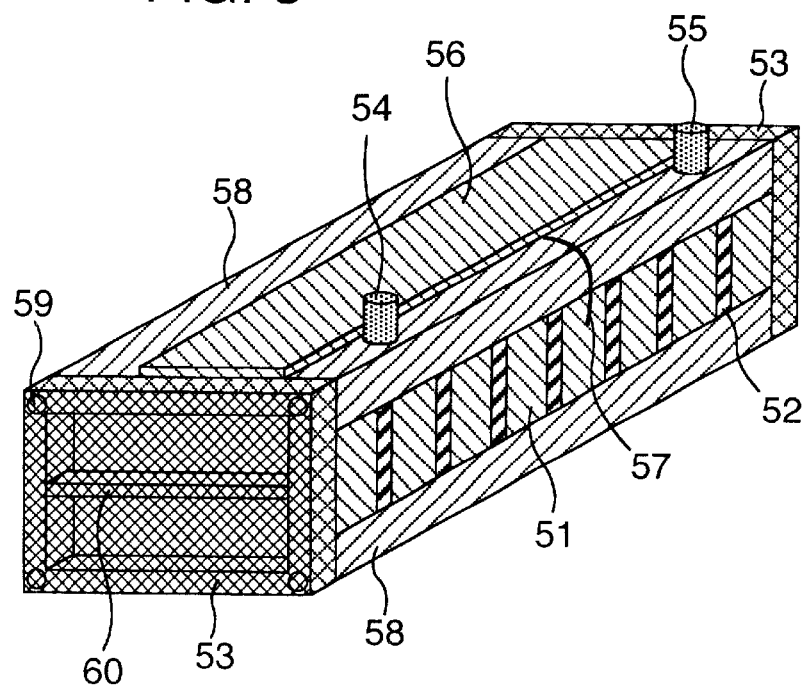
FIG. 5 is a perspective view of the present square type lithium secondary battery.

Said square type lithium secondary batteries 51 were arranged in a row so that their 100 mm×130 mm sides could be counterposed to one another while keeping the battery lids 41 upward to make up a battery assembly of 8 batteries as connected to one another in series, as shown in FIG. 5. Two polytetrafluoroethylene spacers 52, 2 mm×10 mm×100 mm, were inserted between each set of the counterposed sides of batteries 51 along the height direction. Stainless steel metal plates 53 and polytetrafluoroethylene fixing parts 58 fixed to the front and the back, and the sides of the battery assembly, respectively, were set and secured by bolts 59 so as to apply an inward pressure to the batteries 51. A rib-formed projection 60 was formed on each of the stainless steel metal plates 53. Positive electrode terminals and negative electrode terminals on the respective square type batteries 51 were connected by electric cables so as to bring all the batteries into series connection with further connection to a positive electrode terminal 54 and a negative electrode terminal 55 of the battery assembly, respectively. Furthermore, the positive electrode terminals and the negative electrode terminals of the respective batteries 51 were connected to a control circuit substrate 56 through a positive electrode voltage input cable and a negative electrode voltage input cable, respectively, and the voltage and the currents of the respective batteries were measured for charge/discharge control of the battery assembly. The control circuit substrate 56 was provided with a microcomputer so as to have a function of stopping the charging/discharging of the battery assembly when one of the voltages and the current of at least one of batteries 51 comes off a given range. A thermocouple 57 was provided on the side of battery at the 4th position from the back end to input its temperature signal to the control circuit substrate 56 so as to stop charging/discharging when the battery temperature exceed, a given temperature. The battery assembly had an average discharge voltage of 27.2 V and a rated capacity of 38 Ah with 1,030 Wh.

This example shows that the electrode assembly was of a lamination type of strip electrodes, but the same battery assembly as in this example can be made up from a flat, ellipsoidal coil type.

COMPARATIVE EXAMPLE 4

Square type lithium secondary batteries and their battery assembly were produced in the same manner as in Example 8, but scale-formed graphite having an average particle size of 20 μm was used for the negative electrode-active material and a ratio of the negative electrode mix to the positive electrode mix was 1:2.3 by weight.

The square type battery had an average discharge voltage of 3.7 V and a rated capacity of 27 Ah with 100 Wh. The battery assembly had an average discharge voltage of 29.6 V with a rated capacity of 27 Ah with 800 Wh.

EXAMPLE 9

Figure 6:
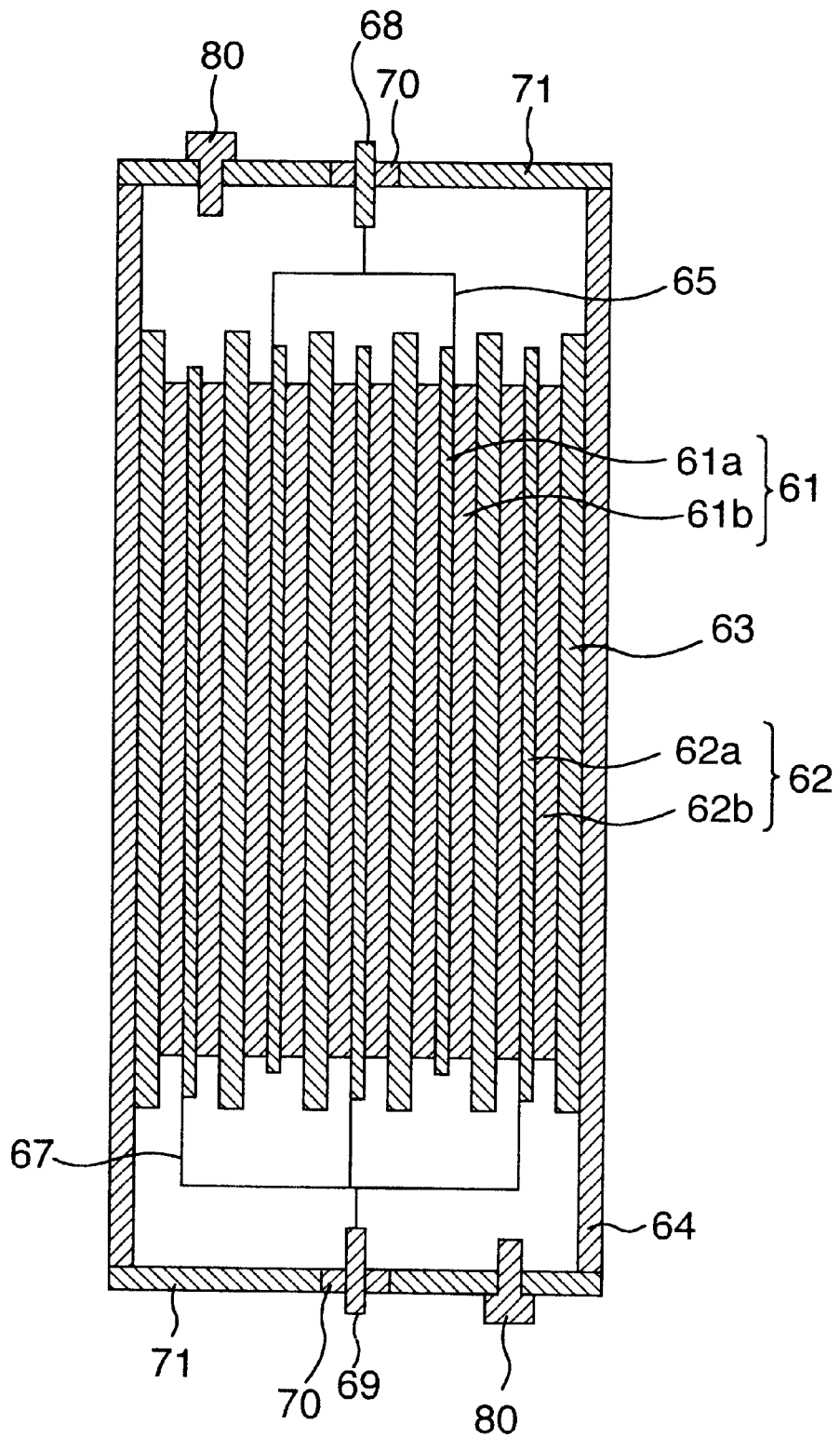
FIG. 6 is a cross-sectional schematic view of the present cylindrical type lithium secondary battery.

A positive electrode, 5,000 mm long and 150 mm wide, and a negative electrode, 5,100 mm long and 155 wide, were prepared in the same manner as in Example 8. FIG. 6 shows a cross-sectional view of a cylindrical type lithium secondary battery according to the present invention. The outside dimensions of the battery were 200 mm high and 60 mm in diameter. An electrode assembly was in a coiled structure comprising a positive electrode 61 comprising a positive electrode current collector 61a and a positive electrode mix 61b, a negative electrode 62 comprising a negative electrode current collector 62a and a negative electrode mix 62b, the positive electrode 61 and the negative electrode 62 being coiled through a separator 61 therebetween.

Positive electrode leads 65 and negative electrode leads 67 welded to the tops of the respective corresponding electrodes were provided at positions opposite to each other at a rate of ten band-formed leads per electrode. The positive electrode leads 65 and the negative electrode leads 67 as a whole were welded to a positive electrode terminal 68 and a negative electrode terminal 69, respectively. The positive electrode terminal 68 and the negative electrode terminal 69 were fixed to a battery lid 71 in an insulated state by polypropylene packings 70. After laser welding of a tubular Al battery can 64 to the battery lid 71, the battery inside was evacuated in vacuum, while keeping a safety valve 80 having both functions of releasing the inside pressure and sealing the inlet for an electrolytic solution off the battery lid 71, and then the electrolytic solution was quickly introduced into the battery. Then, the safety valve 80 was fixed to the battery lid 71 to tightly close the battery. The safety valve can release the gas when the inside pressure of the battery reaches 3 to 7 atmospheres. The cylindrical type battery had an average discharge voltage of 3.4 V and a rated capacity of 38 Ah with 130 Wh.

Figure 7A:
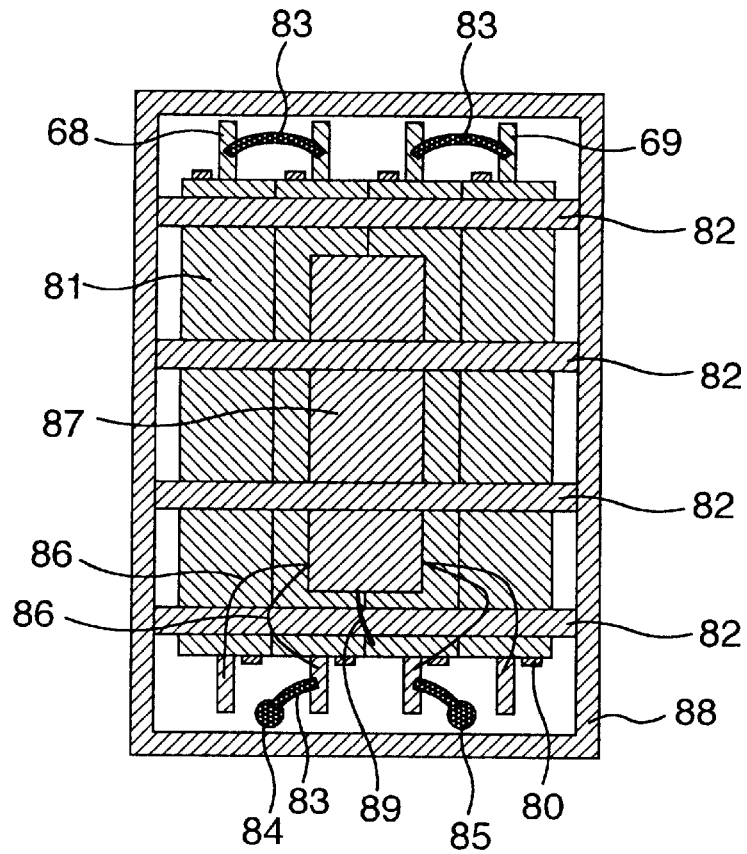
FIG. 7 is a top view and cross-sectional view of the present cylindrical type lithium secondary battery assembly.
Figure 7B:
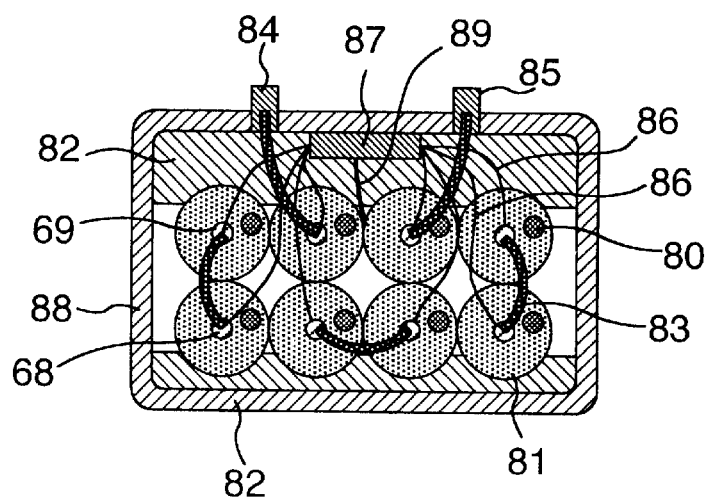
Figure 8:
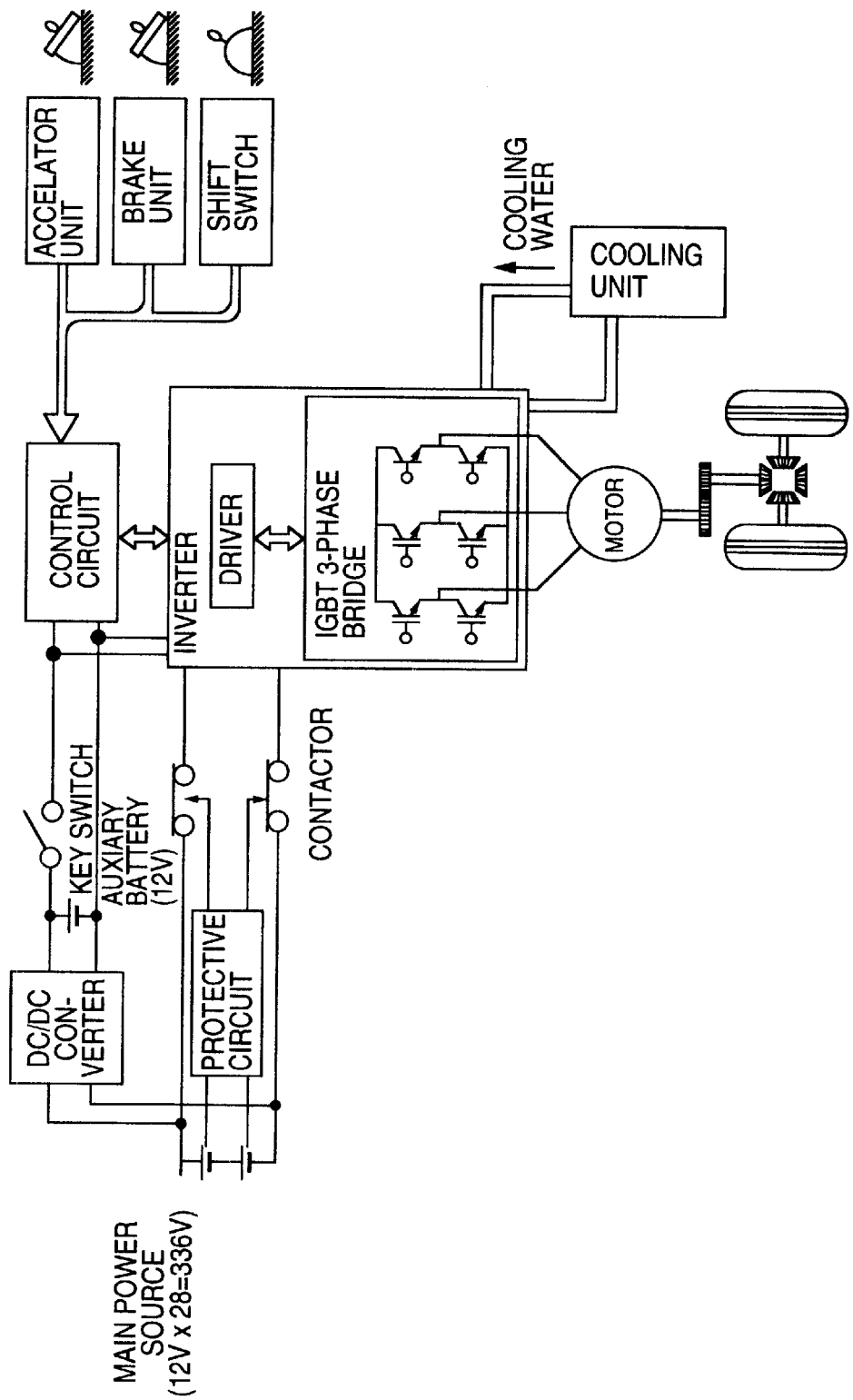
FIG. 8 is a diagram of electric car system using the present lithium secondary batteries.

FIG. 8 shows a top view (a) and a cross-sectional view (b) of a battery assembly of said cylindrical type lithium secondary batteries. The battery assembly was in such a structure that total 8 cylindrical type batteries were arranged with 4 at the upper position and the remaining 4 at the lower position. Polytetralfuoroethylene fixing parts 82 were arranged as shown in FIG. 7 to fix 8 batteries 81. The positive electrode terminals 68 and the negative electrode terminals 69 of cylindrical type batteries 81 were connected by electric cables 83 so as to bring all the batteries into series connection with further connection to a positive electrode terminal 84 and a negative electrode terminal 85 of the battery assembly, respectively. To make the lengths of the current cables 83 of the cylindrical type batteries, the directions of the positive electrode terminals and the negative electrode terminals of the respective batteries 81 were alternated. The positive electrode terminals 68 and the negative electrode terminals 69 of the respective batteries 81 were connected to a control circuit substrate 87 through voltage input cables 86, respectively to measure voltages of the respective batteries for charge/discharge control of the battery assembly. A thermocouple 89 was fixed to the inside surface of the battery arranged at the upper position to input its temperature signal to the control circuit substrate 87. The control circuit substrate 87 was provided with a microcomputer so as to have a function of stopping the charging/discharging of the battery assembly when the voltage of the batteries as a whole and the inside temperature of the battery assembly come off a given range. The battery assembly had an average discharge voltage of 27.2 V and a rated capacity of 38 Ah with 1,030 Wh.

EXAMPLE 10

Scale-formed natural graphite as a raw material was pulverized to particle sizes of not more than 46 μm (and an average particle size of 8.0 μm) by a jet mill. The resulting raw material powder was subjected to heat treatments at 900° C. or 2,850° C. in a nitrogen gas atmosphere for 10 days.

X-ray diffraction of the graphite powder was carried out with a CuKa beam as a beam source at a tube voltage of 40 kV with a tube current of 150 mA. As a result of X-ray diffraction of the graphite, it was found that peaks at about 43.3 degrees and about 46.0 degrees, both belonging to the rhombohedral crystal structure, were reduced even by the heat treatments at 900° C. and 2,850° C., and the rhombohedral crystals were in an amount of not more than 20% by weight of the whole, where about 15% by weight was attributed to the former and about 7% by weight to the latter, and the remaining crystals were substantially hexagonal. The graphite contained about 3% by weight of amorphous carbides.

Amounts of Si contained in the graphite powder as impurities were reduced to 1,140 ppm in case of the heating temperature of 900° C. and to 27 ppm in case of the heating temperature of 2,850° C.

Likewise, the scale-formed raw material graphite was pulverized to not more than 100 μm by a jet mill, followed by dipping the resulting graphite powder into an acid mixture of sulfuric acid and nitric acid for one day, and then by washing with distilled water and neutralization with a dilute aqueous sodium hydroxide solution. The resulting product was dried at 120° C. and subjected to X-ray diffraction. As a result, it was found that!peaks at about 43.3 degrees and about 46.0 degrees, both belonging to the rhombohedral crystal structure, were reduced and its amount was not more than 20% by weight of the whole.

Using these kinds of graphite powder, composite powder of 80 wt. %. SiO-20 wt. % graphite was prepared by a planetary ball mill. The composite powder was found to be substantially same as that obtained in Example 1.

Using graphite powder heat-treated at 2,850° C. in a nitrogen gas atmosphere for 4 hours to 10 days, several kinds of composite powder were likewise prepared.

TABLE 1

| Heat treatment time | Rhombohedral crystal structure proportion (%) | Lithium storing capacity (mAh/g) | Lithium discharge capacity (mAh/g) |
| --- | --- | --- | --- |
| 4 hours | 18.2 | 332 | 320 |
| 10 hours | 14.6 | 345 | 325 |
| 1 day | 13.8 | 343 | 334 |
| 3 days | 11.3 | 355 | 338 |
| 5 days | 9.7 | 368 | 351 |
| 10 days | 7.1 | 365 | 360 |

To investigate battery characteristics, test secondary batteries were produced, using these kinds of composite powder.

Said graphite powder heat-treated at 900° C. or 2,850° C. was admixed with 10 wt. % of poly(vinylidene flouride)

(PVDF) and the resulting mixture was mixed with N-methyl-2-pyrrolidone to prepare a mix slurry. The mix slurry was applied to one side of a 10 µm-thick copper foil, followed by vacuum drying at 120° C. for one hour. Then, the resulting electrode foil was press-formed to a thickness ranging from 85 to 90 µm by a roller press. Amount of coated mix per unit area was 10 mg/cm$^2$ on average, and an electrode was prepared by cutting the electrode foil to a size of 10 mm×10 mm.

As an electrolytic solution, a solution comprising a solvent mixture of ethylene carbonate and diethyl carbonate in a ratio of 1:1 by volume and lithium tetrafluorophosphate at a lithium concentration of 1 mol/l was used.

Lithium storing/discharging was repeatedly carried out by passing a given current between the working electrode and the counterelectrode to investigate the capacity at that time. Lower limit and upper limit voltages of the working electrode were set to 0 V and 5 V, respectively.

By repeating the storing/discharging of lithium, relations between the storing/discharging capacity of lithium and electrode potential at the 5th cycle where their capacities were in a stationary state were investigated.

The lithium secondary batteries using these two kinds of composite powder, respectively, had both the lithium storing capacity and discharge capacity per weight of the active material being more than 300 mAh/g. That is, negative electrodes having a higher capacity could be obtained by using the present graphite powder with not more than 20% by weight of rhombohedral crystals. By using graphite powder having a high purity and not more than 20% by weight of rhombohedral crystals obtained by the he:at treatment at 2,850° C., the lithium storing capacity and discharge capacity showed higher values.

On the basis of the foregoing test results, a cylindrical type lithium cell as shown in FIG. 2 was produced. LiCoO$_2$ as a positive electrode-active material, 7 wt. % of acetylene black as an electro-conductive material and 5 wt. % of poly(vinylidene fluoride) (PVDF) as a binder were mixed together and further admixed with N-methyl-2-pyrrolidone to prepare a slurry of positive electrode mix.

Likewise, the present graphite powder as a negative electrode-active material and 10 wt. % of PVDF as a binder were mixed together and further admixed with N-methyl-2-pyrrolidone to prepare a slurry of negative electrode mix.

The positive electrode mix was applied to both sides of a 25 µm-thick aluminum foil, followed by vacuum drying at 120° C. for one hour. Then, the resulting electrode foil was press molded to a thickness of 195 µm, whereby an amount of applied mix per unit area was made to be 55 mg/cm$^2$. A positive electrode was prepared by cutting the electrode foil to a size, 40 mm wide and 285 mm long. The aluminum coil was exposed in the positive electrode-uncoated, 10 mm-long regions at both edges of the positive electrode, and a positive electrode tab was pressure welded to one end of the positive electrode by ultrasonic welding.

On the other hand, the negative electrode mix was applied to both sides of a 10 µm-thick copper foil, followed by vacuum drying at 120° C. for one hour. Then, the resulting electrode foil was press molded to a thickness of 175 µm by a roller press. An amount of the applied mix per unit area was 5 mg/cm$^2$, and a negative electrode was prepared by cutting the electrode foil to a size, 40 mm wide and 290 mm long. As with the positive electrode, the copper foil was exposed in the negative electrode mix-uncoated, 10 mm-long regions at both edges of the negative electrode, and a negative electrode tab was pressure welded to one end of the negative electrode by ultrasonic welding.

As a separator, a microporous polypropylene film, 25 µm thick and 44 mm wide, was used. The positive electrode, the separator, the negative electrode and the separator were laminated in this order and coiled to prepare an electrode assembly. Then, the electrode assembly was inserted into a battery can, and the negative electrode was welded to the can bottom, and a draw part for caulking the positive electrode lid to the can was provided at the peripheral edge of the battery can. An electrolytic solution containing 1 mol/l of lithium hexafluorophosphoric acid dissolved in a solvent mixtures of ethylene carbonate and diethyl carbonate in a ratio of 1:1 by volume was introduced in the battery can, and the positive electrode tab was welded to the positive electrode lid, followed by caulking the positive electrode lid, thereby producing a battery.

Charging/discharging of the battery was repeated with a charge/discharge current of 300 mA at a discharge end voltage of 4.2 V and a discharge end voltage of 2.8 V. Furthermore, rapid charging/discharging was carried out by changing the charge current in a range between 300 mA and 900 mA.

Charging/discharging of the lithium secondary battery was repeated to investigate changes in the discharge capacity of the battery. As a result, it was found that the maximum discharge capacity was 683 Ah/g and a reduction ratio of the discharge capacity at 200th cycle to the maximum capacity was 86%.

Furthermore, relations between the charge/discharge current and the discharge capacity, when rapid charging/discharging was carried out, were investigated. As a result, it was found at charge/discharge currents of 900 mA the discharge capacity was 573 mAh/g and the reduction ratios of the capacity to the discharge capacity at charge discharge currents of 900 mA were 16%, respectively. By using the present graphite powder as a negative electrode-active material, the reduction ratio of capacity was improved by at least 80%, showing that the present lithium secondary battery had rapid charging/discharging characteristics.

By using graphite powder having particle sizes of not more than 100 µm and not more than 20% by weight of rhombohedral crystal structure as a negative electrode-active material, a lithium secondary battery having a distinguished reversibility of lithium-storing/discharging reactions, a higher energy density and distinguished rapid charging/discharging characteristics can be obtained.

EXAMPLE 11

Amorphous SiO particles having an average particle size of 10 µm and the graphite particles having an average particle size of 20 µm obtained in Example 10 were joined together in a ratio of 80:20 by weight and subjected to a ball mill treatment for 48 hours by the same planetary ball mill as used in Example 1. The powder preparation and the ball mill treatment were carried out in an Ar atmosphere. Results of analyzing the resulting SiO-graphite composite powder by wide angle X-ray diffraction revealed that the d002 of graphite was 0.3367 nm. Lc and R value were also found to be 30 nm and 0.8, respectively. As a result of observing the cross-sections of said composite powder, it was found that the SiO particles were embedded in the graphite particles and SiO had an average particle size of 0.8 µm and particle sizes of not more than 10 µm for at least 98% by weight. The SiO-graphite composite powder had a specific surface area of 49 m$^2$/g and particle sizes of not more than 40 µm for at least 98% by weight.

Said SiO-graphite composite powder, petroleum pitch and tetrahydrofuran were mixed together in a ratio of 100:30:300 and stirred under reflux for one hour. The tetrahydrofuran was removed therefrom in a rotary evaporator, followed by vacuum drying at 150° C. for 3 hours, thereby obtaining a SiO-graphite composite powder/pitch composite material.

The composite material was disintegrated to 200-mesh and under by a cutter mill, heated up to 250° C. in air at a rate of 3° C./mn and kept at that temperature for one hour. Then, the product was heated up to 1,100° C. in a nitrogen gas stream at a rate of 20° C./h and kept at that temperature, thereby carbonizing the pitch the carbonization product was disintegrated to 200-mesh and under by a cutter mill, thereby obtaining SiO-graphite-pitch composite powder. Results of the resulting SiO-graphite-pitch composite powder by X-ray diffraction revealed that the d002 of graphite had two peaks, i.e. 0.3368 nm and 0.3435 nm. R value was found to be 1.0. The SiO-graphite-pitch composite powder had a specific surface area of 28 $m^2/g$.

A battery using said SiO-graphite-pitch composite powder as a negative electrode-active material was produced in the same manner as in Example 1. $LiNi_{0.8}Co_{0.2}O_2$ having an average particle size of 10 μm was used for the positive electrode material. As an electrolytic solution, a solution containing 1 mole/l of $LiPF_6$ dissolved in a 3:6:1 solvent mixture of EC, DMC and DEC was used.

The battery was subjected to a charging/discharging cycle test by charging with a charge current of 1 mA at a charge end voltage of 4.15 V and discharging with a discharge current of 1 mA at a discharge end voltage of 2.8 V. As a result, it was found that the initial discharge capacity of the battery was 6.8 mAh and a ratio of irreversible capacity was 13%. On the other hand, a discharge capacity maintenance ratio of 100th cycle to 1st cycle was found to be 92%.

EXAMPLE 12

Si, Ge or Al particles having an average particle size of 10 μm and the graphite particles having an average particle size of 20 μm obtained in Example 10 were joined together in a ratio of 50:50 by weight and subjected to a ball mill treatment comprising repeating mechanical pressure welding in a planetary ball mill for 24 hours. The ball mill vessel and balls were made from stainless steel, and the powder preparation and the ball mill treatment were carried out in an Ar atmosphere. Results of analyzing the resulting Si, Ge or Al-graphite composite powder by wide angle X-ray diffraction revealed that peaks showing diffractions by carbon, Si, etc. were observed, and the d002 of carbon was 0.3358 nm. Lc was found to be 45 nm. No diffraction peaks by carbides of Si, etc. were observed. R value was also found to be 0.3. As a result of observing the cross-sections of said composite powder, it was found that the particles of Si, etc. were embedded in the graphite particles and an average particle of Si, etc. was about 2 μm. Specific surface areas of these kinds of composite powder were found to be 63 $m^2/g$. The composite powder and a solution of PVDF in N-methylpyrrolidone were kneaded in a ratio of composite powder:PVDF=85:15 by weight, and applied to a 20 μm-thick Cu foil, followed by drying at 120° C. for one hour and pressure molding to an electrode piece by a roller press. Ultimately, the electrode piece was subjected to blanking to obtain a negative electrode, 20 mm in diameter.

For the positive electrode-active material, $LiCoO_2$ powder having an average particle size of 10 μm was used. $LiCoO_2$ powder, graphite and PVDF were mixed together in a ratio of $LiCoO_2$ powder graphite:PVDF=90:6:4 by weight to prepare a slurry. In this case, the PVDF was used in a solution in N-methylpyrrolidone, as in case of the negative electrode. The slurry, after the thorough kneading, was applied to a 20 μm-thick Al foil, followed by drying at 120° C. for one hour and press molding to an electrode piece b a roller press. Ultimately, the electrode piece was subjected to blanking to obtain a positive electrode, 20 mm in diameter. Due to the large capacity of the negative electrode, a ratio of the positive electrode mix to the negative electrode mix of 15 by weight was used.

A coin type battery, as shown in FIG. 1, was made from said negative electrode and said positive electrode prepared in the foregoing steps was produced to evaluate its characteristics. A positive electrode 2 comprising a positive electrode current collector 2a and a positive electrode mix 2b was mounted on a stainless steel positive electrode can 1 by spot welding, whereas a negative electrode 4 comprising a negative electrode current collector 4a and a negative electrode mix 4b was mounted on a stainless steel negative electrode can 3 by spot welding. Both the positive electrode and the negative electrode were impregnated with an electrolytic solution containing 1 mole/l of $LiPF_6$ dissolved in a 1:2 solvent mixture of ethylene carbonate (EC) and dimethyl carbonate (DMC), and then the positive electrode and the negative electrode were counterposed to each other, while interposing a polyethylene separator 5 therebetween, and the positive electrode can and the negative electrode can were fixed to each other by pressure welding through an insulating gasket 6.

The battery was subjected to a charging/discharging cycle test by charging with a charge current of 1 mA at a charge end voltage 4.2 V and discharging with a discharge current of 1 mA at a discharge end voltage of 2.7 V. As a result, it was found that the initial discharge capacity of the battery was 12.5 mAh and a ratio of irreversible capacity was 24%. On the other hand, a discharge capacity maintenance ratio of 100th cycle to 1st cycle was found to be 85%.

EXAMPLE 13

FIG. 8 is a diagram showing a system structure made up by producing 12 sets of battery assemblies having the same specification as in Example 9, arranging the battery assemblies in a series connection to prepare a battery assembly module, and mounting the battery assembly module on an electric car. The battery assembly module was provided on the bottom of the electric car body. By operating a control unit with a wheel by a driver, an output from the battery assembly module was adjusted to transmit power to a gearbox. By utilizing the power from the converter, the motor and wheels were driven to drive the electric car. When the electric car was driven at a rated capacity of 80% by one charging, the capacity reduction ratio of the battery assemblies was 2–5% after 100 runs of driving. As the lithium secondary battery, those using negative electrodes disclosed in Examples 1 to 8 and 10 to 12 can be likewise mounted besides that of this Example.

By turning a key switch on and pressing down on the accelerator as in the ordinary gasoline cars, motor torque or resolutions can be controlled according to a press-down angle of the accelerator. When the accelerator is restored, a regenerative brake corresponding to an, engine brake is actuated, and when the brake is pressed down, the regenerative brake force is further increased. With a shift lower signal, shifting to forward movement or backward movement of car is carried out always at a constant gear ratio. For the control system, an IGBT vector control inverter system using an induction motor is used. Power voltage is set to 336 V from the-viewpoint of the voltage withstanding of IGBT.

In this Example, the output is set to a maximum output of 45 kW and a maximum torque of 176 N.m from the viewpoint of power performances (acceleratability and gradeability) of cars, and the rated output is set to 30 kW from the viewpoint of maximum speed specification. As principal control items, forward/backward movement control, and regenerative control as well as fail-safe control of cars are carried out.

Heat density is increased with smaller sizes and lighter weights of motors, and thus it is important to provide an efficient cooling structure. Ordinary air cooling system gives rise to temperature elevation of motors and thus the water cooling system as for the ordinary engines. A cooling water passage is provided within an aluminum frame covering the motor proper, and designed in the most suitable shape by temperature elevation simulation. Cooling water is introduced from the feed inlet of water passage within the frame and discharged after absorption of head from the motor proper, followed by cooling through a radiator in the circulation route. With such a water cooling structure, the cooling efficiency can be improved about three times as high as that by the air cooling.

In the inverter, IGBT is used for the power element with heat release of a few kW at maximum during the maximum output. In addition, heat is released from surge absorber resistances, filter condensers, etc. Thus, it is necessary to control those parts to a temperature to the allow able temperature or less for efficient cooling. Particularly, IGBT cooling is a problem, and air,cooling, water cooling, oil cooling, etc. can be taken as a cooling system, but a forced water cooling system is preferred, because of easy operation and efficient cooling.

Figure 9:
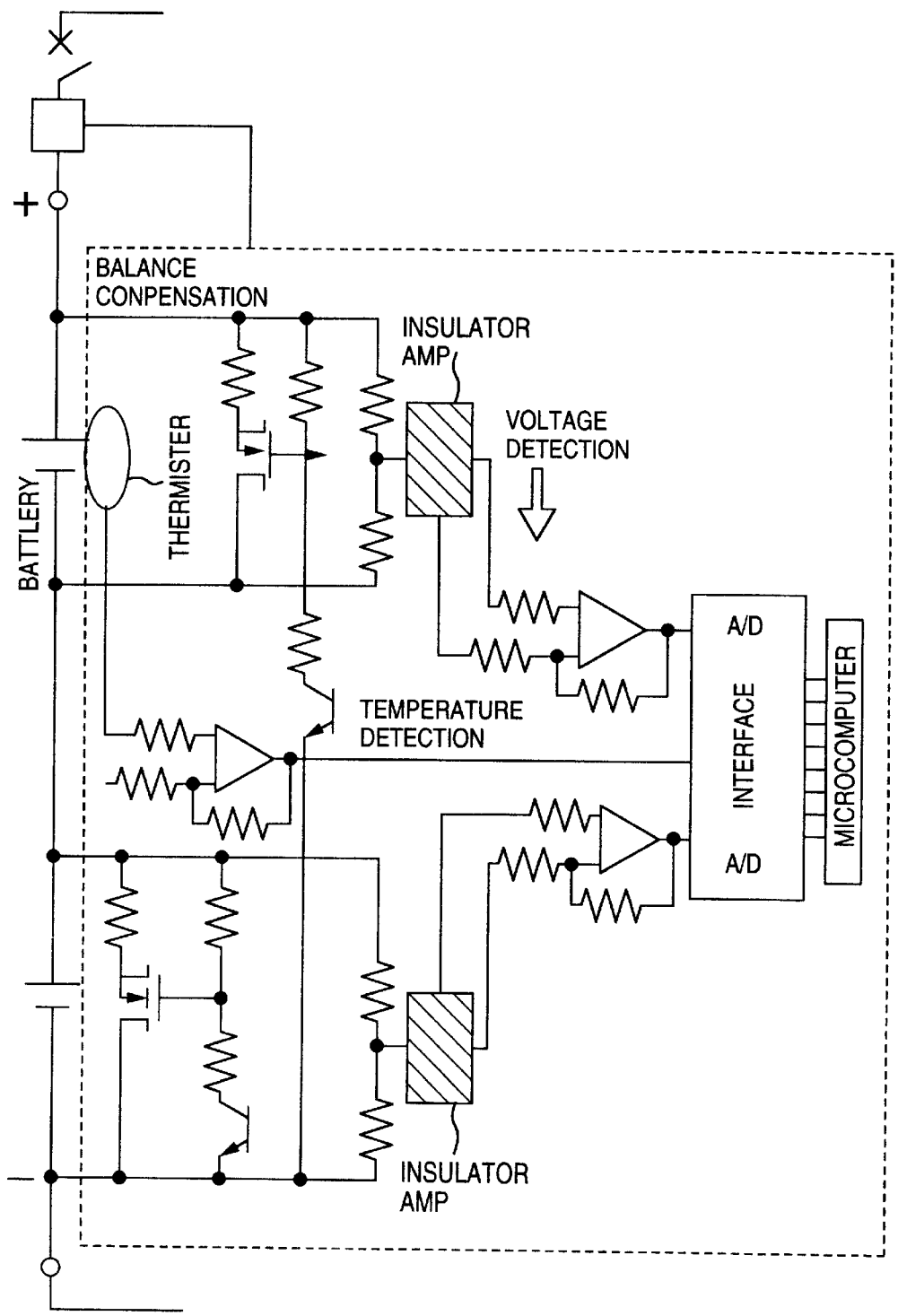
FIG. 9 is a diagram of protective circuit using the present lithium secondary battery.

In the lithium secondary batteries as a power source in this Example, a protective circuit as shown in FIG. 8 is provided. The protective circuit is to protect the batteries from overcharging and overdischarging. The protective circuit comprises a balance compensation circuit for adjusting cell voltages of the individual batteries and a temperature detection circuit, provided in the individual batteries, as shown in FIG. 9. The balance compensation circuit and the temperature detection circuit are controlled by a microcomputer. In the lithium secondary batteries of this Example, the electrolytic solution is combustible and thus a thermistor is provided in the individual batteries to detect, temperature or pressure, and its monitoring must be carried out. However, in other examples where an electrolytic solution is non-combustible that is even if a flame point is approached to the electrolytic solution, no such a flame is spread to the solution, it is not necessary to monitor the specific temperature or pressure, resulting in saving a safety mechanism in the protective circuit. When overcharging/overdischarging is detected, the power source is automatically turned off, as shown in FIG. 8.

Figure 10:
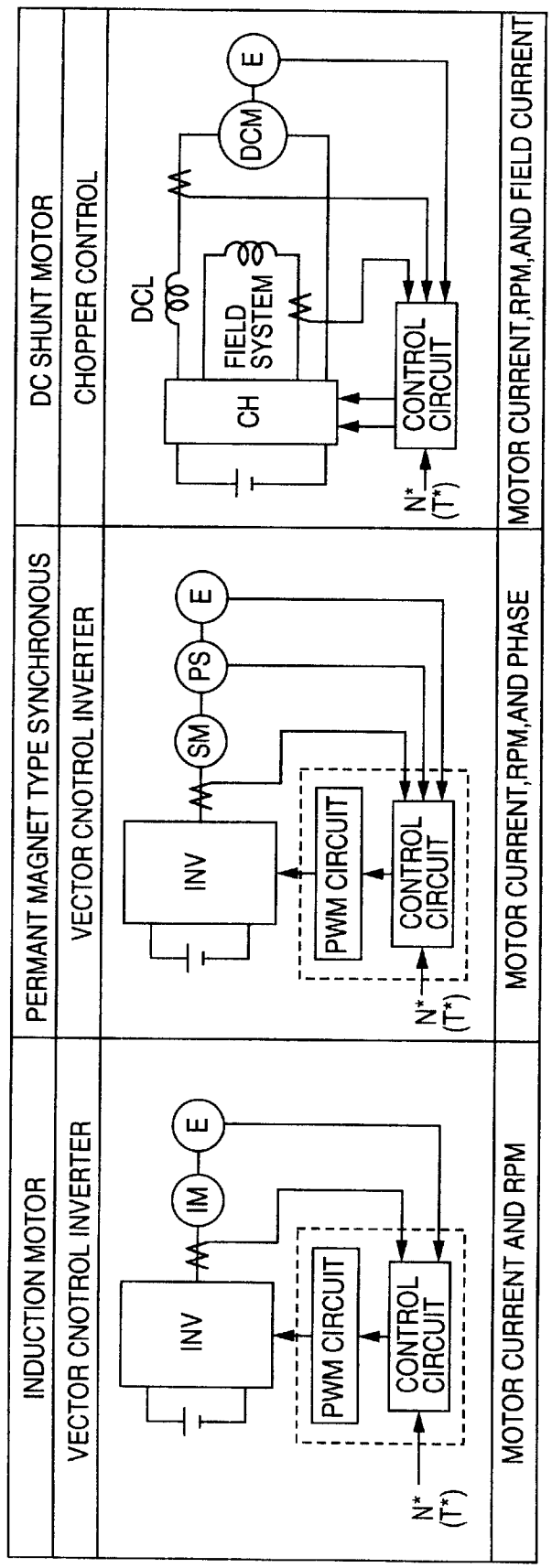
FIG. 10 is a system diagram of various electric cars using the present lithium secondary batteries.

This example shows an embodiment of using an induction motor, but the present lithium secondary batteries can be likewise used in an electric car using a permanent magnetic type, synchronous motor or a DC shunt motor, as shown in FIG. 10, where INV stands for an inverter, IM for an induction motor, E for encoder, SM for a synchronous motor, PS for a position sensor, PWM for pulse width modulation, DCM for a DC motor, CH for a chopper, N* for speed command, T* for torque command. In the.respective rows in FIG. 10, control systems, system structures and main control parameters are indicated.

EXAMPLE 14

Figure 11:
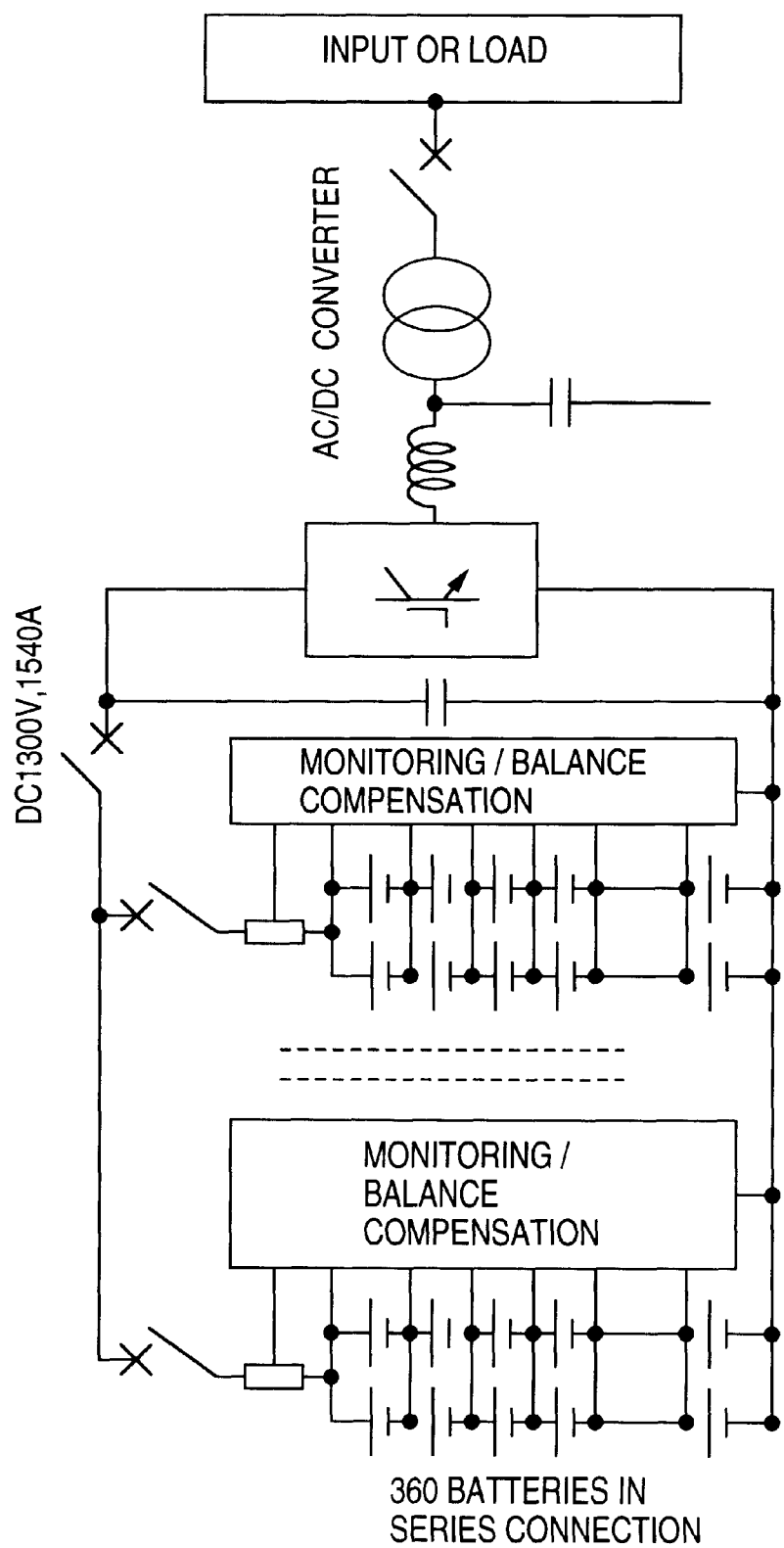
FIG. 11 is a diagram of power storage system using the present lithium secondary batteries.

FIG. 11 is a structural diagram showing a power storage system for night power, using lithium secondary batteries disclosed in Examples 1 to 12. The present embodiment of power storage system is directed to 2,000 kW×4 h and a cell capacity of 1,000 Wh, using 360 batteries in series connection and 24 rows in parallel connection. In this Example, it is necessary to protect the batteries from overcharging and overdischarging, as in Example 13, where the protective circuit having monitoring and balance convensation circuits, as shown in FIG. 9, is used.

In this Example, the batteries can be protected as well as in the foregoing.

This Example is directed to a large capacity power storage, but is also effective for household air conditioners, electric water-heating systems, etc.

As mentioned above, the present invention provides a lithium secondary battery having distinguished cycle characteristics and a high capacity.

What is claimed is:

1. A lithium secondary battery, which comprises a positive electrode, a negative electrode containing a lithium ion-storable/dischargeable negative electrode-active material and a lithium ion conductive, non-aqueous electrolytic solution or polymer electrolyte, characterized in that the negative electrode-active material consists essentially of oxide particles containing one element selected from Si and Sn, and particles of graphite and carbonaceous material, the oxide particles being embedded in the particles of graphite by mechanical pressure welding, and partially exposed to the outside of the carbonaceous material that covers the oxide particles and graphite.

2. A lithium secondary battery, which comprises a positive electrode, a negative electrode containing a lithium ion-storable/dischargeable negative electrode-active material and a lithium ion-conductive, non-aqueous electrolytic solution or polymer electrolyte, characterized in that the negative electrode-active material consists essentially of a composite powder containing particles of graphite and carbonaceous material and lithium ion-interstitially diffusible/releasable metal oxide particles of Si or Sn capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of graphite by mechanical pressure welding and partially exposed to the outside of the carbonaceous material that covers the oxide particles and graphite, and the interstitially diffusible/releasable particles having an average particle size of not more than 5 $\mu$m and particle sizes of not more than 10 $\mu$m for at least 90% by weight thereof.

3. A lithium secondary battery, which comprises a positive electrode, a negative electrode containing a lithium ion-storable/dischargeable negative electrode-active material and a lithium ion-conductive, non-aqueous electrolytic solution or polymer electrolyte, characterized in that the negative electrode material consists essentially of a composite powder containing particles of carbonaceous material and lithium ion-interstitially diffusible/releasable metal oxide particles of Si or Sn capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of graphite by mechanical pressure welding and partially exposed to the outside of the carbonaceous material that covers the oxide particles and graphite, and the composite powder has a particle size of not more than 50 $\mu$m for at least 90% by weight thereof.

4. A lithium secondary battery, which comprises a positive electrode, a negative electrode containing a lithium ion-storable/dischargeable negative electrode-active material, and a lithium ion-conductive, nonaqueous electrolytic solution or polymer electrolyte, characterized in that the negative electrode-active material consists essentially of a composite powder containing graphite particles and lithium ion-interstitially diffusible/releasable metal oxide particles of Si or Sn capable of enhancing a lithium ion interstitial diffusibility/releasability to/from the graphite between the positive electrode and the negative electrode when charged/discharged, the interstitially diffusible/releasable particles being embedded by mechanical pressure welding in the graphite particles and partially exposed to the outside of a carbonaceous material that covers the oxide particles and graphite particles, and the graphite particles comprises at least one of not less than 80% by weight of hexagonal crystals and not more than 20% by weight of rhombohedral crystals.

5. A lithium secondary battery according to any one of claims 1 to 4, characterized in that the carbonaceous material or the graphite has a (002) interplanar spacing of 0.3350 nm to 0.3650 nm by X-ray diffraction.

6. A lithium secondary battery according to any one of claims 1 to 4, characterized in that the carbonaceous material or the graphite has a peak intensity ratio of 1360 $cm^{-1}$ to 1580 $cm^{-1}$ being a 15 to 2.0 by argon laser Raman spectrometry.

7. A lithium secondary battery according to any one of claims 1 to 4, characterized in that the composite powder has a specific surface area of 1 to 100 $m^2/g$.

8. A lithium secondary battery according to anyone of claims 1 to 4, characterized in that the metal oxide particles are crystalline or amorphous.

9. A process for producing a lithium secondary battery comprising a positive electrode, a negative electrode containing a lithium ion-storable/dischargeable negative electrode-active material and a lithium ion-conductive nonaqueous electrolytic solution or polymer electrolyte, said process comprising a step of mechanically pulverizing and pressure welding particles of graphite and lithium ion-interstitially diffusible/releasable metal oxide particles of Si or Sn capable of enhancing a lithium ion interstitial diffusibility/releasability to/from the graphite between the positive electrode and the negative electrode when charged/discharged, thereby embedding at least 50% by weight of the interstitially diffusible/releasable particles in the particles of graphite, wherein the oxide particles are partially exposed to the outside of a carbonaceous material that covers the oxide particles and graphite particles, thereby preparing the negative electrode-active material.

10. A process for producing a lithium secondary battery comprising a positive electrode, a negative electrode containing a lithium ion-storable/dischargeable negative electrode-active material and a lithium ion-conductive nonaqueous electrolytic solution or polymer solution, said process comprising a step of mixing oxide particles containing one element selected from Si and Sn with a carbon precursor, followed by mechanical pressure welding, followed by carbonization, thereby embedding the oxide particles in graphite resulting from the carbonization, and a step of pulverizing the graphite to a desired particle size, wherein the oxide particles are partially exposed to the outside of a carbonaceous material that covers the oxide particles and graphite particles, thereby preparing the negative electrode-active material.

11. A process for producing a lithium secondary battery comprising a positive electrode, a negative electrode containing a lithium ion-storing/dischargeable negative electrode-active material and a lithium ion-conductive non-aqueous electrolytic solution or polymer electrolyte, said process comprising a step of mechanically pulverizing and pressure welding particles of graphite and lithium ion interstitially diffusible/releasable metal oxide particles of Si or Sn capable of enhancing an interstitial diffusibility/releasability to/from the graphite during the positive electrode and the negative electrode when charged/discharged, in a ball mill, thereby embedding at least 50% by weight of the interstitially diffusible/releasable particles in the particles of graphite, thereby preparing a composite powder, and a step of mixing the composite powder with a carbon precursor, followed by carbonization and pulverization to desired particle sizes, wherein the oxide particles are partially exposed to the outside of a carbonaceous material that covers the oxide particles and graphite particles, thereby preparing the negative electrode-active material.

12. A process for producing a lithium secondary battery according to any one of claims 9 to 11, wherein the carbonaceous material contains a graphite portion having a (002) interplanar spacing of 0.3350 nm to 0.3650 nm by X-ray diffraction and a peak intensity ratio of 1360 $cm^{-1}$ to 1580 $cm^{-1}$ being 0.15 to 2.0 by argon laser Raman spectroscopy, the oxide particles have an average particle size of not more than 10 $\mu$m and the negative electrode-active material has a specific surface area of 1 to 100 $m^2/g$.

13. A negative electrode material for a lithium secondary battery, characterized by comprising a composite powder consisting essentially of particles of graphite and carbonaceous material and lithium ion interstitially diffusible/releasable metal oxide particles of Si or Sn capable of enhancing a lithium ion interstitial diffusibility/releasability to/from the carbonaceous material between a positive electrode and a negative electrode when charged/discharged, at least 50% by weight of the interstitially diffusible/releasable particles being embedded in the graphite by mechanical pressure welding, and partially exposed to the outside of the carbonaceous material that covers the oxide particles and graphite, and the interstitially diffusible/releasable particles having an average particle size of not more than 5 $\mu$m and particle sizes of not more than 10 $\mu$m for at least 90% by weight thereof or the composite powder having particle sizes of not more than 50 $\mu$m for at least 90% by weight thereof.

14. A negative electrode material for a lithium secondary battery, characterized by comprising a composite powder consisting essentially of graphite particles and lithium ion interstitially diffusible/releasable metal oxide particles of Si or Sn capable of enhancing a lithium ion interstitial diffusibility/releasability to/from the graphite between a positive electrode and a negative electrode when charged/discharged, at least 50% by weight of the interstitially diffusible/releasable particles being embedded in the graphite particles by mechanical pressure welding and partially exposed to the outside of a carbonaceous material that covers the oxide particles and graphite particles, and the graphite particles comprising at least one of not less than 80% by weight of hexagonal crystals and not more than 20% by weight of rhombohedral crystals.

15. An electrical appliance, characterized in that the lithium secondary battery according to any one of claims 1 to 4 is used as a power source.

16. An electrical appliance according to claim 15, characterized in that the lithium secondary battery is provided with a protective means against overcharging and overdischarging.

17. A lithium secondary battery, which comprises a positive electrode, a negative electrode containing a lithium ion-storable/dischargeable negative electrode-active material and a lithium ion conductive, non-aqueous electrolytic solution or polymer electrolyte, characterized in that the negative electrode-active material consists essentially of oxide particles containing one element selected from Si and Sn, and particles of graphite and carbonaceous material, the oxide particles being embedded in the particles of graphite by mechanical pressure welding, and partially exposed to the outside of the carbonaceous material that covers the oxide particles and graphite.

18. A lithium secondary battery, which comprises a positive electrode, a negative electrode containing a lithium ion-storable/dischargeable negative electrode-active material and a lithium ion-conductive, non-aqueous electrolytic solution or polymer electrolyte, characterized in that the negative electrode-active material consists essentially of a composite powder containing particles of graphite and carbonaceous material and lithium ion-interstitially diffusible/releasable metal oxide particles of Si or Sn and capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of graphite by mechanical pressure welding and partially exposed to the outside of the carbonaceous material that covers the oxide particles and graphite, and the interstitially diffusible/releasable particles having an average particle size of not more than 5 $\mu$m and particle sizes of not more than 10 $\mu$m for at least 90% by weight thereof.

19. A lithium secondary battery, which comprises a positive electrode, a negative electrode containing a lithium ion-storable/dischargeable negative electrode-active material and a lithium ion-conductive, non-aqueous electrolytic solution or polymer electrolyte, characterized in that the negative electrode material consists essentially of a composite powder containing particles of graphite and carbonaceous material and lithium ion-interstitially diffusible/releasable metal oxide particles of Si or Sn and capable of enhancing a lithium ion interstitial diffusibility/releasability to/from the carbonaceous material between the positive electrode and the negative electrode when charged/discharged, at least 50% by weight of the interstitially diffusible/releasable particles being embedded in the particles of graphite by mechanical pressure welding, and partially exposed to the outside of the carbonaceous material that covers the oxide particles and graphite, and the composite powder has a particle size of not more than 50 $\mu$m for at least 90% by weight thereof.

20. A lithium secondary battery, which comprises a positive electrode, a negative electrode containing a lithium ion-storable/dischargeable negative electrode-active material, and a lithium ion-conductive, non-aqueous electrolytic solution or polymer electrolyte, characterized in that the negative electrode-active material consists essentially of a composite powder containing graphite particles and lithium ion-interstitially diffusible/releasable metal oxide particles of Si or Sn and capable of enhancing a lithium ion interstitial diffusibility/releasability to/from the graphite between the positive electrode and the negative electrode when charged/discharged, the interstitially diffusible/releasable particles being embedded in the graphite particles by mechanical pressure welding, and partially exposed to the outside of a carbonaceous material that covers the oxide particles and graphite, and the graphite particles comprises at least one of not less than 80% by weight of hexagonal crystals and not more than 20% by weight of rhombohedral crystals.

* * * * *